(12) United States Patent
Chang et al.

(10) Patent No.: US 12,342,233 B2
(45) Date of Patent: Jun. 24, 2025

(54) BEAMFORMING FOR DYNAMIC CELL SWITCHING

(71) Applicant: Apple Inc., Cupertino, CA (US)

(72) Inventors: Wenting Chang, Beijing (CN); Shirish Nagaraj, Pleasanton, CA (US); Bishwarup Mondal, San Jose, CA (US); Yuan Zhu, Beijing (CN); Yushu Zhang, Beijing (CN)

(73) Assignee: Apple Inc., Cupertino, CA (US)

(*) Notice: Subject to any disclaimer, the term of this patent is extended or adjusted under 35 U.S.C. 154(b) by 50 days.

(21) Appl. No.: 18/503,610

(22) Filed: Nov. 7, 2023

(65) Prior Publication Data

US 2024/0179593 A1    May 30, 2024

Related U.S. Application Data

(63) Continuation of application No. 16/977,000, filed as application No. PCT/CN2017/097237 on Aug. 11, 2017, now Pat. No. 11,864,042.

(60) Provisional application No. 62/373,460, filed on Aug. 11, 2016, provisional application No. 62/373,828, filed on Aug. 11, 2016.

(51) Int. Cl.
*H04W 36/08* (2009.01)
*H04W 36/00* (2009.01)
*H04W 72/23* (2023.01)

(52) U.S. Cl.
CPC ..... *H04W 36/085* (2023.05); *H04W 36/0064* (2023.05); *H04W 72/23* (2023.01)

(58) Field of Classification Search
CPC ........... H04W 36/085; H04W 36/0064; H04W 72/23; H04B 7/086; H04B 7/024
See application file for complete search history.

(56) References Cited

U.S. PATENT DOCUMENTS

| 8,737,504 B2 | 5/2014 | Liu et al. | |
| 2016/0183222 A1* | 6/2016 | Suzuki | H04L 5/0073 |
| | | | 370/336 |
| 2017/0332283 A1* | 11/2017 | Kubota | H04W 72/23 |
| 2020/0305038 A1* | 9/2020 | Tooher | H04W 36/0005 |

FOREIGN PATENT DOCUMENTS

| CN | 101605375 A | 12/2009 |
| CN | 102273092 A | 12/2011 |
| CN | 102484550 A | 5/2012 |
| CN | 105144621 A | 12/2015 |

OTHER PUBLICATIONS

International Search Report dated Sep. 27, 2017 for International Application No. PCT/CN2017/097237.
International Preliminary Report on Patentability dated Feb. 12, 2019 for International Application No. PCT/CN2017/097237.

* cited by examiner

*Primary Examiner* — Ashley Shivers
(74) *Attorney, Agent, or Firm* — Eschweiler & Potashnik, LLC; Matthew W Glause

(57) ABSTRACT

The first circuitry may be operable to establish a first UE Receive (Rx) beam as being for reception of data from a first eNB. The second circuitry may be operable to process a transmission including Downlink Control Information (DCI), wherein the DCI carries an eNB cell-switching indicator. The first circuitry may also be operable to establish a second UE Rx beam as being for reception of data from a second eNB based on the eNB cell-switching indicator.

20 Claims, 12 Drawing Sheets

BEAMFORMING FOR DYNAMIC CELL SWITCHING

REFERENCE TO RELATED APPLICATIONS

This application is a Continuation application of the U.S. patent application Ser. No. 16/977,000, now U.S. Pat. No. 11,864,042, which is a National Phase entry application of International Patent Application No. PCT/CN2017/097237 filed Aug. 11, 2017, which claims priority under 35 U.S.C. 119 (e) to U.S. Provisional Patent Application Ser. No. 62/373,460 filed Aug. 11, 2016, and claims priority under 35 U.S.C. 119 (e) to U.S. Provisional Patent Application Ser. No. 62/373,828 filed Aug. 11, 2016, which are herein incorporated by reference in their entirety.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system. Next-generation wireless cellular communication systems may provide support for higher bandwidths in part by supporting higher carrier frequencies, such as centimeter-wave and millimeter-wave frequencies. In turn, next-generation wireless cellular communication systems may provide support for centimeter-wave and millimeter-wave in part by supporting beamforming.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
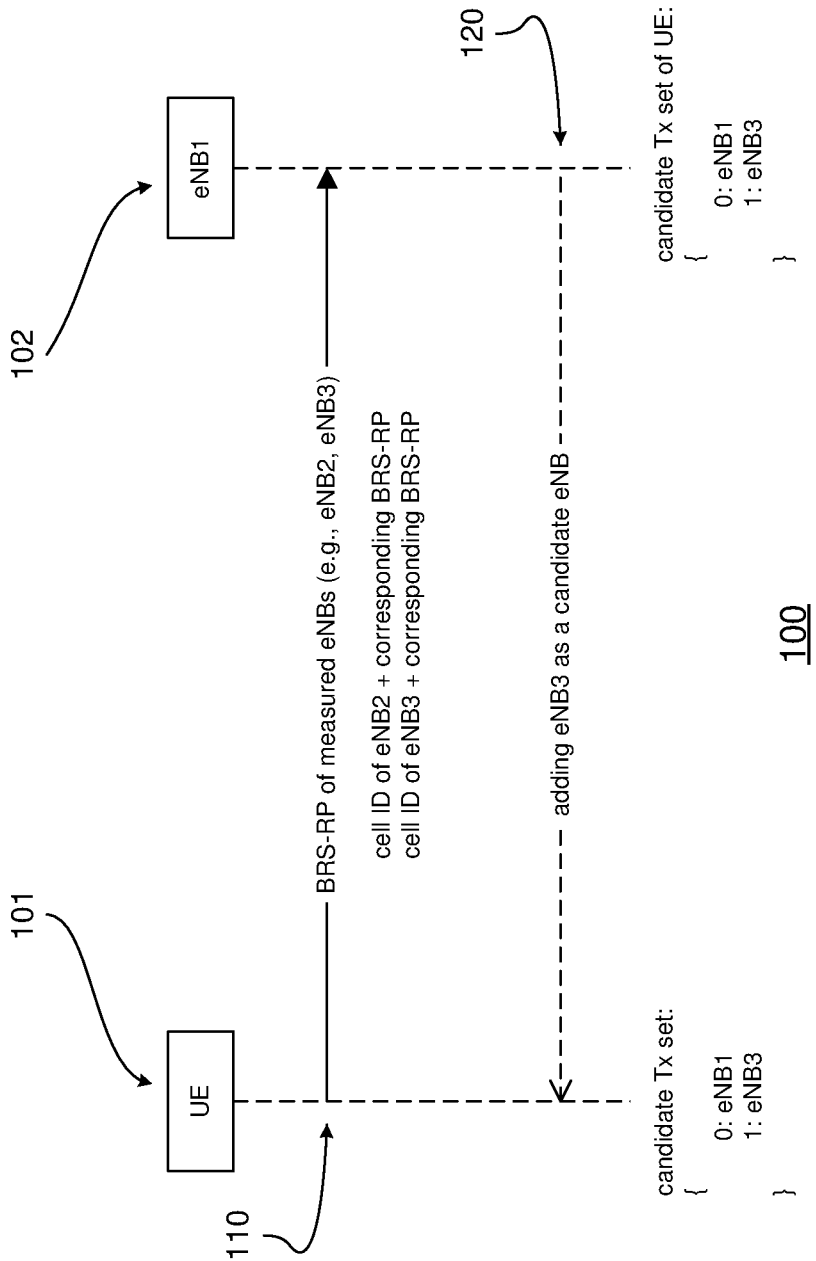
FIG. 1 illustrates a protocol diagram for Beam Reference Signal Receive Power (BRS-RP) reporting, in accordance with some embodiments of the disclosure.

The advanced radio access technology exploits advanced multiple input and multiple output (MIMO) (e. g. massive MIMO), Cooperative Multi-point (COMP) transmission and reception schemes, and/or multiple transmission and reception points (multi-TRPs) connectivity, in order to provide high area traffic capacity and consistent user experience. Narrow beam based system operation with a large number of antennas may increase spectral efficiency by potentially reducing the interference and enabling more users to be spatially multiplexed, and beamforming is a crucial technology component to enable operation in mid-to-high frequency bands. Furthermore, flexible transmission/reception point switching and multi-point beam aggregation, which can be realized via ideal backhaul based COMP schemes or non-ideal backhaul based multi-connectivity, may be beneficial to overcome channel blockage in mid/high frequency bands and naturally support seamless mobility.

In the presence of highly spatial selective channels, UE beamforming may considerably improve the receive performance. The optimal UE receive beam directions with respect to geographically separated access points (APs)/total radiated power (TRPs) can be different. To exploit the full potential of receive beamforming, UE may adapt its receive beam direction to the transmitter. Specifically, to improve the control channel reception reliability, it can be beneficial to enable DPS/COMP transmission for physical control channel scheduling DL/UL data. In this case, the physical control channel can be dynamically transmitted from different TRPs on a subframe basis. If the optimal UE receive beam directions to different TRPs are different, and UE with one analog beamformer, can steer one receive beam direction with the maximum beamforming gain at a time, it is challenging for UE to simultaneously monitor all the possible control channel candidates from different TRPs. It is therefore necessary to take these constraints into account for the physical control channel design with the support of COMP operation.

Presented are some aspects of several processes to enable physical control channel COMP transmission requiring different UE receive beam directions. A UE may report the measurement results together with the signaling information about non-simultaneous reception of different APs/TRPs requiring different receive beam directions. A base station may design and configure the control channel search space by taking into account the above signaled restriction information. The following transmission schemes may be supported:

I. beam/polarization diversity transmission can be supported while the UE is implicitly signaled about proper receive (rx) beam;

II. dynamic point transmission can be supported, such as, configuring TRP specific control channel (e.g., subframe pattern). At a particular subframe, UE may only monitor the beamforming design (BD) candidates associated those TRPs which can be received simultaneously by using the same receive beam direction; and/or III. control channel with repetitions from multiple TRPs can also be supported. For example, control channel search space may include blind decoding candidates repeated from different TRPs (and subframes), and different rx beams may be needed in different subframes.

The presented aspects may enable UE rx beamforming to be applied for the control channel reception. As a result, the achieved rx beamforming gain can increase the control channel coverage and enhance the control channel spectrum efficiency which can be further translated into control channel capacity improvement.

In some aspects, some mobility reference signals and/or (beamformed) CSI-RSs may be transmitted in each NR small cell, and the UE after establishing RRC connection, can report the RSRP and/or RSRQ of the detected reference signals to the anchor cell. Based on the measurement report, the anchor cell may configure the UE with the control channel search space including control channel candidates being transmitted from other NR small cells and/or different TRPs within the same cell. This can potentially improve the control channel coverage and capacity due to the increased scheduling flexibility. When the reported RSRP/RSRQ of different NR small cells/TRPs are obtained by using different receive beams in time sharing manner, it can be beneficial for UE to indicate such restriction, i.e., non-simultaneous reception from different TRPs requiring different receive beams, to the camped anchor cell. This can help the anchor cell to properly design the control channel search space to take into account the signaled UE receive restriction. The several aspects are disclosed to enable UE to signal the reception restriction so that anchor cell eNB can properly design the control channel search space to support COMP transmission with respect to those restrictions.

Signaling to Indicate the Non-Simultaneous Reception of Different TRPs

In the RSRP/RSRQ measurement report, UE can divide the RSRP/RSRQ results of detected TRPs/NR small cells into several groups, and each group is comprised of those TRPs measured by using same receive beam directions. As such, the TRPs in different groups may be detected and measured by using different receive beam directions. For example, if 4 TRPs, named as #C1, #C2, #C3 and #C4, are detected by the UE, and the UE employs the beam #b1 for #CI and #C2, beam #b2 for #C3, and beam #b3 for #C4, then a single measurement report can be structured as follows:

```
Measurement report := {
  { Group 0: RSRP/RSPQs of #CI and #C2};
  { GroupI: RSRP/RSPQs of #C3 };
  { Group2: RSRP/RSPQs of #C4}
}
```

In some other aspects, the measurement results for different TRPs using different receive beams may be transmitted in multiple separate measurement reports. For the above example, UE may transmit three measurement reports as follows:

Measurement report 1:={RSRP/RSPQs of #CI and #C2};
Measurement report 2:={RSRP/RSPQs of #C3};
Measurement report 3:={RSRP/RSPQs of #C4}.

In both single measurement report scheme and multiple measurement reports scheme, UE may report more than one RSRP/RSRQ for one TRP measured with different non-coexist UE beams. In this case, the RSRP/RSRQ measurements of one TRP/NR small cell can appear in either several groups of the single measurement report or several measurement reports. The multiple RSRP/RSRQ measurement results report per TRP can potentially enable dynamic intra-TRP beam selection for control channel transmission.

Beam/Polarization Diversity Transmission

In some aspects, several beamformed CSI-RSs, some of which can be virtualized by using different polarizations of the antenna array, can be simultaneously transmitted from a TRP or NR small cell eNB, and UE is close to one TRP or NR small cell eNB, the UE may only report the RSRP/RSRQs of several beamformed CSI-RSs associated with the same TRP or NR small cell eNB. If reasonably good RSRP/RSRQs corresponding to several beamformed CSI-RSs are measured by using same RX beam so that they are reported in the same group of the measurement report in embodiment S1, or in the same measurement report in embodiment S2, the anchor NR eNB may configure one control channel SS associated with the strongly received TRP to the UE. In this case, beam/polarization diversity transmission can be an important transmission technique to enhance the coverage of control channel. In embodiments, beam/polarization diversity may be achieved by having each control channel candidate in the configured search space to be transmitted by two beams, and each beam may be only transmitted from single polarization. At the receiver side, UE may monitor the SS from two beam directions using two polarizations. This may increase diversity and robustness against blockage of single beam transmission and reception of control channels in one SS.

In some aspects, the SS configuration may include the relationship between one DMRS port and beamformed CSI-RSs. For example, if the measurement report discussed above has the following information:

Measurement report 1:={RSRP/RSRQ of #BFedCsiRs1 and #BFedCsiRs2}, where beamformed CSI-RS1 and CSI-RS2 are simultaneously transmitted from one TRP, then one example configuration can be set up as:

DMRS port 7: Beamformed CSI-RS1 of measurement report 1
DMRS port 8: Beamformed CSI-RS2 of measurement report 1.

With the above SS with two DMRS ports configuration, the beam diversity transmission can be naturally supported.

TRP-Specific Control Channel Subframe Configuration

In this embodiment, an anchor cell can configure several control channel sets, each of which is associated with a particular TRP, to the UE. And each control channel set may be configured with a specific subframe pattern, on which UE monitors the blind decoding candidates of the respective control channel set. The subframe patterns of those control channel sets associated with TRPs which cannot be simultaneously received by the UE, may not overlap each other. For instance, with the single measurement report example above, the anchor cell can configure three TRP-specific control channel sets to the UE, named as SS1 associated with #CI, SS2 with #C2, and SS3 with #C3. Each SS can be configured with a specific subframe pattern. Since #CI and #C2 can be received simultaneously by the same receive beam direction, subframe pattern of SS1 and SS2 can be the same. However, the subframe pattern of SS3 may not overlap with SS1 and SS2. For example, SS1 and SS2 can be configured with the subframe pattern {0, 1, 3, 4, 6, 7, 9, 10, . . . } and SS3 can have the subframe pattern {2, 5, 8, . . . }.

In this process, each SS configuration shall include the information about the identity of associated TRP or NR small cell, so that UE is able to determine which rx beam direction should be applied to monitor the SS during a particular subframe.

Repetition Across Several TRPs

To enhance the control channel reliability, in addition to use different aggregation levels, in some aspects, control channel candidates may be adopted with different repetition levels, i.e., single BD candidate comprised of several repetitions transmitted in different TRPs. For example, in addition to SS1, SS2, and SS3, the UE can be configured with an additional SS, named as SS4, in which each BD candidate can be comprised of all candidates from SS1, SS2 and SS3. As a result, each BD candidate in SS4 can benefit from the beam diversity from C1, C2 and C3. To allow UE to apply proper rx beam to decode a BD candidate of SS4, the configuration message of SS4 can include the information about the identities of multiple TRPs/NR small cells as well as the respective subframe patterns.

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced system, and a 5th Generation wireless system/5th Generation mobile networks (5G) system/5th Generation new radio (NR) system.

In 5G systems, high-frequency band usage may be adopted to improve user-experienced data rates. In high-frequency bands, beamforming, including Transmit (Tx) side and Receive (Rx) side beamforming, may be applied and may provide enhanced beamforming gain. This may advantageously compensate for pathloss in high-frequency bands and suppress mutual user interference.

For one User Equipment (UE), a preferred beam (e.g., a UE/eNB beam pair) may be different for different Enhanced Node-Bs (eNBs). For example, a first beam of a UE may be a preferred beam when transmitting information to and receiving information from a first eNB (e.g., an eNB1), and a second beam of the UE may be a preferred beam when transmitting information to and receiving information from a second eNB (e.g., an eNB2).

When the eNB serving a UE changes from one eNB to another eNB (for example, in dynamic point selection), the beam that the UE uses to connect to the eNB may be disposed to switching along with the beam employed by the eNB that the UE connects to, in order to minimize or eliminate link loss.

Discussed herein are mechanisms and methods for beamforming reporting and switching upon dynamic changes in eNB beams serving a UE, such as when an eNB serving a UE changes. Some embodiments may incorporate a Beam Reference Signal Receive Power (BRS-RP) mode. Some embodiments may incorporate a symbol-specific Downlink Control Information (DCI) configuration among multiple candidate cells. Some embodiments may incorporate a DCI configured-cell switching.

The mechanisms and methods discussed herein may have a variety of advantages. First, some embodiments may extend a Coordinated Multi-Point (COMP) set definition, and may add a beamform index and/or a corresponding receive power. In some systems, when an eNB is determined to be and eNB connected to a UE, the UE may be disposed to maintain and report (e.g., provide BRS-RP for) a UE beam used in the connection. This may result in increased reporting. For a UE with a single panel, a beam measurement of eNBs in one COMP set may be Time-Division Multiplexed (TDMed). A pre-determined time (e.g., a pre-determined time pipe) for an eNB COMP set may be defined, and may advantageously reduce or eliminate an overhead of the TDMed configuration.

Second, when reporting a BRS-RP, a new identifier may be reported, which may advantageously help distinguish the eNB within a COMP set.

Third, in a flexible COMP set, at a given time, a number of eNBs within the COMP set (up to and including all eNBs in the COMP set) may send a date to the UE. As discussed herein, a UE may utilize different UE Rx beams to sweep Physical Downlink Control Channel (PDCCH, and/or 5G PDCCH (xPDCCH)). Accordingly, the UE may advantageously detect an eNB that is active if a corresponding PDCCH is received.

Fourth, a dynamic procedure may advantageously enable COMP sets to dynamically switch an active eNB. Such procedures may incorporate control signaling and various eNB and UE behaviors.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a millimeter-wave (mmWave) capable eNB or an mmWave small cell, an Access Point (AP), and/or another base station for a wireless communication system. For purposes of the present disclosure, the term "UE" may refer to a legacy LTE capable User Equipment (UE), a next-generation or 5G capable UE, an mmWave capable UE, a Station (STA), and/or another mobile equipment for a wireless communication system.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

FIG. 1 illustrates a protocol diagram for Beam Reference Signal Receive Power (BRS-RP) reporting, in accordance with some embodiments of the disclosure. A protocol 100 may comprise a UE 101 and an eNB 102 (e.g., an "eNB1") in a wireless communication link with each other (e.g., over one or more UE Tx/Rx beams and one or more corresponding eNB Tx/Rx beam, or over a UE/eNB beam pair). eNB 102 may be a serving eNB. In a first part 110, UE 101 may transmit to eNB 102 one or more BRS-RP as measured for one or more eNBs (e.g., an "eNB2" and/or an "eNB3"). In a second part 120, eNB 102 may transmit to UE 101 an indication that an eNB (e.g., "eNB3") is added as a candidate eNB.

In some embodiments, a cell ID may be transmitted with a BRS-RP. The cell ID may indicate a cell to which the BRS-RP corresponds. In this way, BRS-RP of one or more other cells may be reported to a serving cell, which may (as discussed further herein) facilitate cell switching.

For some embodiments, a candidate eNB set may be configured by an eNB through higher-layer signaling. A virtual index may be derived by sorting one or more eNBs within the measurement set (e.g., a set of eNBs being measured) in an increasing order of cell ID. In some embodiments, the virtual index within a specific measurement set may be transmitted together with a corresponding BRS-RP.

Accordingly, a UE may report BRS-RP of different eNBs to a serving eNB. Based on the BRS-RP (and/or, in some embodiments, a Reference Signal Receive Power (RSRP), such as an RSRP used in beam sweeping) an eNB (e.g., a serving eNB) may determine a candidate eNB and may inform the UE of the candidate eNB. Within this candidate Tx set, the serving eNB may be represented by a virtual index having a first value (e.g., a value of "0"), and the candidate eNB may be represented by the virtual index having a second value (e.g., a value of "1").

In some embodiments, if a preferred Network (NW) beam (e.g., an eNB-side beam) of any eNB is present within a COMP set, a UE may report it. For some embodiments, a virtual cell ID (which may have a first value for a serving eNB, for example "0," and which may have a second value for a candidate eNB, for example "1") may be reported, along with a corresponding BRS-RP, so as to indicate beam information of an eNB within the set that is reported.

Figure 2:
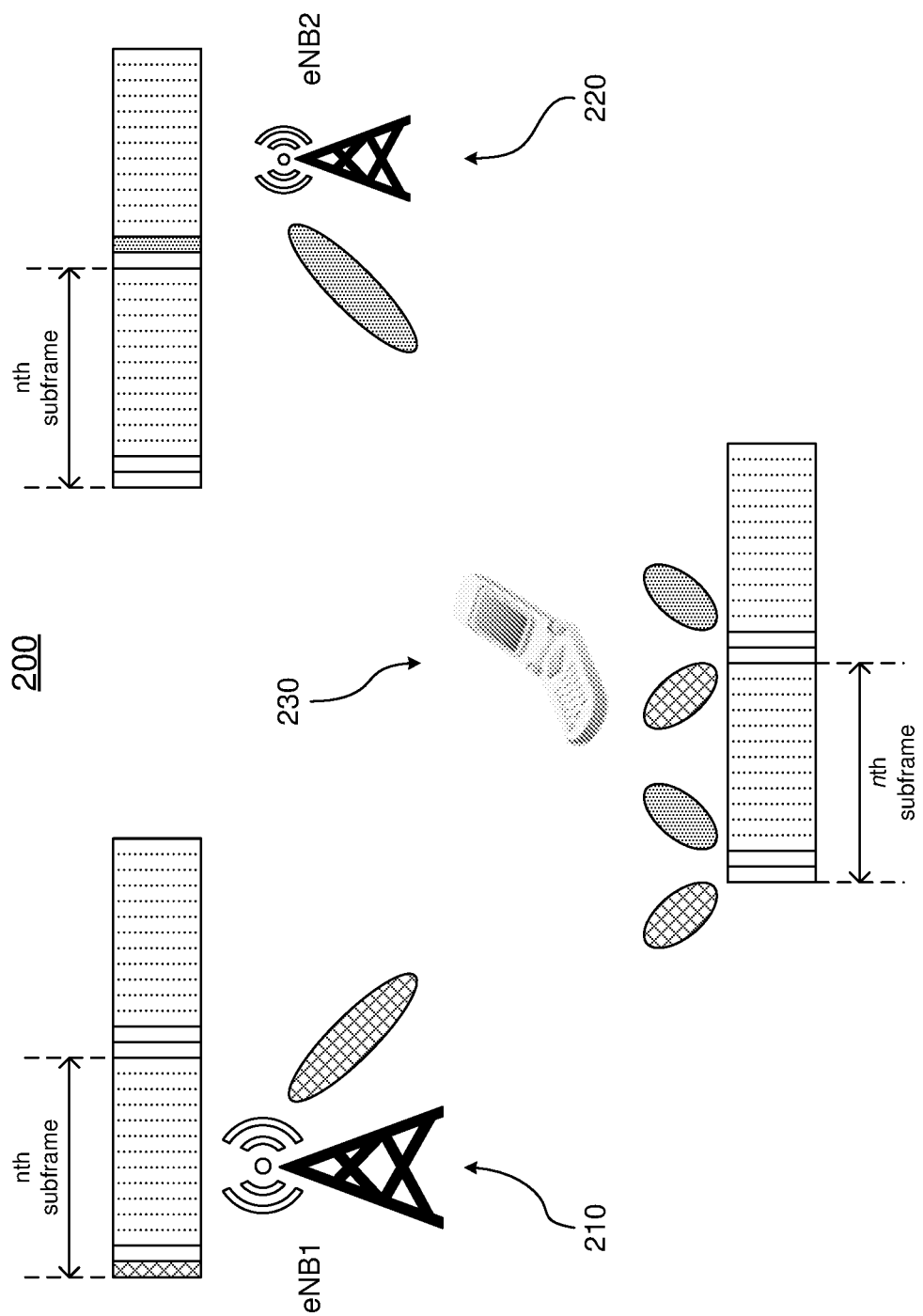
FIG. 2 illustrates a scenario of symbol-specific Downlink Control Information (DCI) transmission, in accordance with some embodiments of the disclosure.

FIG. 2 illustrates a scenario of symbol-specific DCI transmission, in accordance with some embodiments of the disclosure. A scenario 200 may comprise a first eNB 210 (e.g., an eNB1), a second eNB 220 (e.g., an eNB2), and a UE 230.

In some embodiments, a PDCCH or xPDCCH of different eNBs within the candidate set may be transmitted at different OFDM symbols. Moreover, a virtual ID of an eNB may be utilized to derive or determine an index of the OFDM symbol. For example, as depicted in FIG. 1, at a subframe n (e.g., at an nth subframe), if first eNB 210 has data to transmit to UE 230, first eNB 210 may transmit a DCI at a first OFDM symbol (e.g., an OFDM symbol having an index of 0). At a following subframe n+1 (e.g., at an (n+1)th subframe), if second eNB 220 has data to transmit to UE, second eNB 220 may transmit a DCI at a second OFDM symbol (e.g., an OFDM symbol having an index of 1).

UE 230 may then receive the first OFDM symbol based on a first UE Rx beam, and may receive the second OFDM symbol based on a second UE Rx beam. UE 230 may then blindly detect DCI for the first OFDM symbol and/or the second OFDM symbol. If DCI is detected at the first OFDM symbol, UE 230 may utilize the first UE Rx beam for the following data reception (for example, the assignment of Physical Downlink Shared Channel (PDSCH), 5G PDSCH (xPDSCH), Physical Uplink Shared Channel (PUSCH), and/or 5G PUSCH (xPUSCH)). Otherwise, if DCI is detected at the second OFDM symbol, UE 230 may utilize the second UE Rx beam for the following data reception (for example, the assignment of PDSCH, xPDSCH, PUSCH, and/or xPUSCH).

In some embodiments, if a UE is unable to detect DCI within one OFDM symbol, an offset subframe indicator may be configured by higher-layer signaling (e.g., via an $N_{DCI-OFFSET}$ parameter). A DCI in an nth subframe may then be utilized to configure the assignment of PDSCH, xPDSCH, PUSCH, and/or xPUSCH of an (n+$N_{DCI-OFFSET}$)th subframe (e.g., a subframe that follows the nth subframe by $N_{DCI-OFFSET}$ Subframes).

For some embodiments, a symbol-specific DCI transmission may be applicable to scenarios in which one UE may be equipped with one panel. In some embodiments, a symbol-specific DCI transmission may be applicable to scenarios in which one UE may be equipped with two panels, but two eNBs are associated with the same panel.

Figure 3:
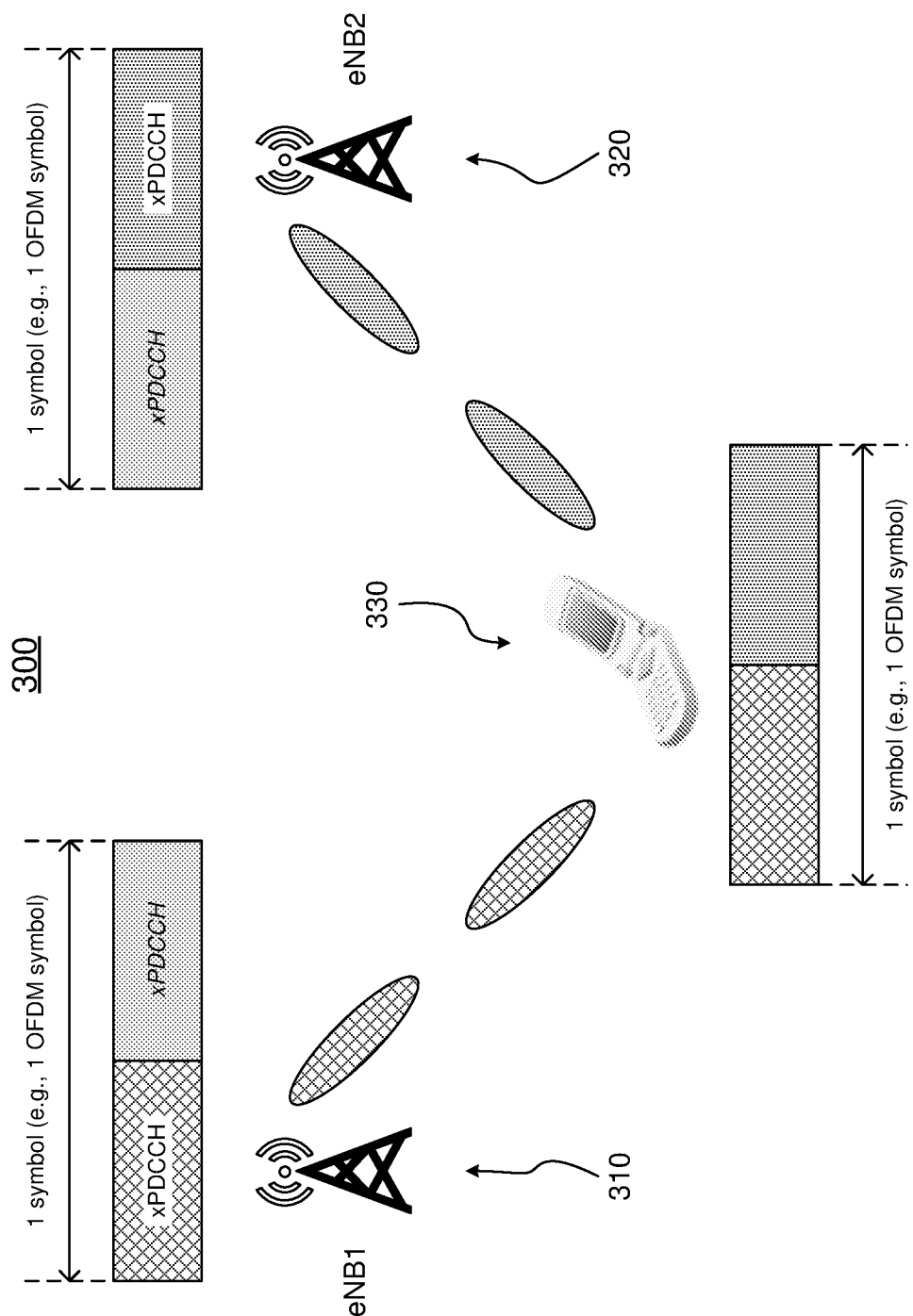
FIG. 3 illustrates a scenario of symbol-specific DCI transmission, in accordance with some embodiments of the disclosure.

FIG. 3 illustrates a scenario of symbol-specific DCI transmission, in accordance with some embodiments of the disclosure. A scenario 300 may comprise a first eNB 310 (e.g., an eNB1), a second eNB 320 (e.g., an eNB2), and a UE 330.

In some embodiments, an Interleaved Single Carrier Frequency-Division Multiple Access (IFDMA) may be applied on a PDCCH or xPDCCH, so that a time-domain duplicated PDCCH or xPDCCH structure may be obtained. For example, first eNB 310 and/or second eNB 320 may transmit duplicate symbols (e.g., by transmitting PDCCH or xPDCCH for two halves of an OFDM symbol). UE 330 may then use a first UE Rx beam corresponding with first eNB 310 to receive a first-half signal, and may use a second UE Rx beam corresponding with second eNB 320 to receive a second-half signal.

In various embodiments discussed herein, a mapping rule between eNB virtual IDs and OFDM symbols assigned to eNBs may be configured by higher-layer signaling, or may be configured by DCI signaling. For example, for a first UE, a first mapping rule may configure a first OFDM symbol and a second OFDM symbol may correspond, respectively, to a first virtual cell ID (e.g., a virtual cell ID #0) and a second virtual cell ID (e.g., a virtual cell ID #1). In contrast, for a second UE, a second mapping rule (e.g., an inverse mapping rule) may configure the first OFDM symbol and the second OFDM symbol to correspond, respectively, to the second virtual cell ID and the first virtual cell ID.

For some embodiments, an eNB cell switching may be indicated by DCI. In some embodiments, a 1-bit cell-switching indicator may be configured by DCI, and may indicate to a UE whether (or not) to perform the cell switching. For some embodiments, a 2-bit virtual ID of a target eNB may be configured by DCI, so that a UE may switch to a beam corresponding to the target eNB. In some embodiments, a subframe offset (e.g., an $N_{DCI-OFFSET}$ parameter) may be configured by a DCI, and may indicate to a UE to switch a beam corresponding to a target eNB at a later subframe (e.g., a number $N_{DCI-OFFSET}$ of subframes later).

In some embodiments, a non-acknowledgement (NACK) may be reported to indicate to an eNB that a DCI for cell switching was correctly received. For some embodiments, whether (or not) to trigger cell switching may be indicated by a value of an $N_{DCI-OFFSET}$ parameter. A first value of $N_{DCI-OFFSET}$ (e.g., a value of "0") may indicate that a current cell may be maintained.

Figure 4:
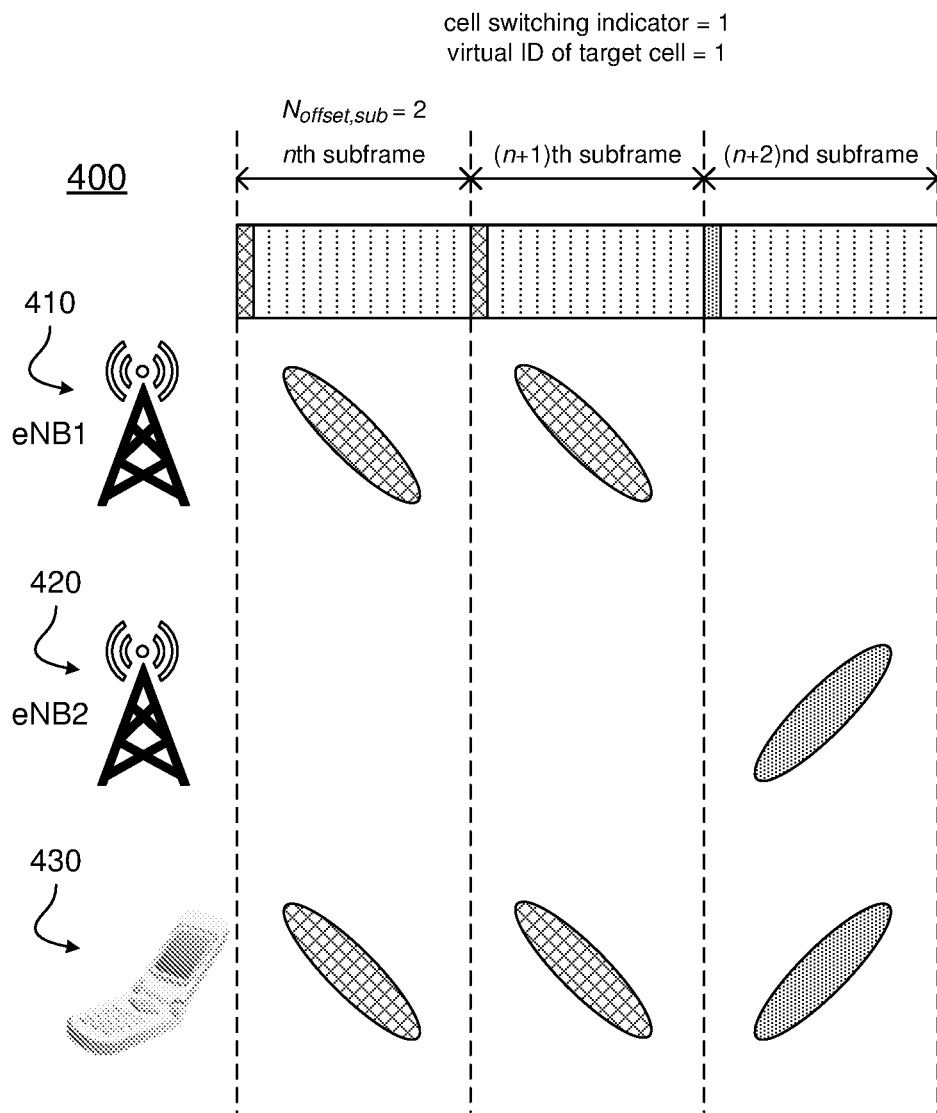
FIG. 4 illustrates a scenario of DCI-indicated cell switching, in accordance with some embodiments of the disclosure.

FIG. 4 illustrates a scenario of DCI-indicated cell switching, in accordance with some embodiments of the disclosure. A scenario 400 may comprise a first eNB 410 (e.g., an eNB1), a second eNB 420 (e.g., an eNB2), and a UE 430.

First eNB 410 may correspond with a current cell. First eNB 410 may configure cell-switching parameters during a DCI at an nth subframe. For example, an $N_{DCI-OFFSET}$ parameter may be set to a value of "2" by first eNB 410. For UE 430, a UE beam (e.g., a UE Rx beam and/or a UE T beam) corresponding to first eNB 410 may be adopted for transmission and/or reception (e.g., PDCCH, xPDCCH, PDSCH, xPDSCH, PUSCH, and/or xPUSCH) at an nth subframe and an (n+1)th subframe. Then, a UE beam (e.g., a UE Rx beam and/or a UE Tx beam) corresponding to second eNB 420 may be adopted for the following transmission and/or reception (e.g., PDCCH, xPDCCH, PDSCH, xPDSCH, PUSCH, and/or xPUSCH) at an (n+2)nd subframe.

In some embodiments, the cell switching mechanisms and methods discussed herein may also be utilized for different transmission points (TPs).

Figure 5:
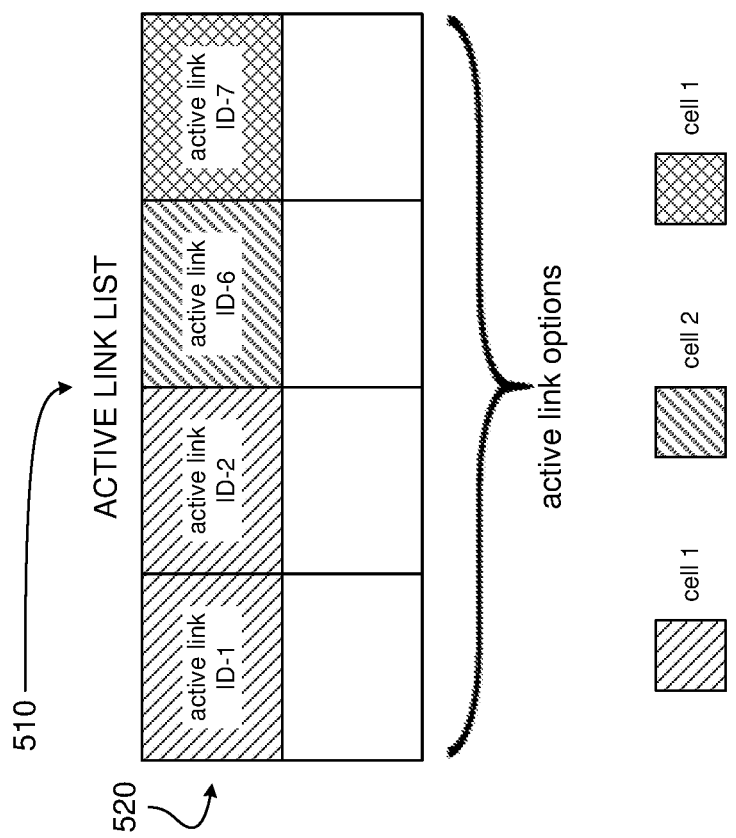
FIG. 5 illustrates a scenario of active link lists, in accordance with some embodiments of the disclosure.

FIG. 5 illustrates a scenario of active link lists, in accordance with some embodiments of the disclosure. An active link list 510 may comprise a candidate list 520 comprising identifiers of one or more candidate links (e.g., via link IDs and/or corresponding cell IDs, and/or corresponding virtual cell IDs).

Active link list 510 may accordingly comprise a list of multiple candidate links. One or more of the listed links may correspond to the same cell, or may correspond to different cells. For example, FIG. 5 depicts active link list 510 as containing preferred links of a cell 1, a cell 2, and a cell 3.

In some embodiments, additions to, deletions from, or updating of active link list 510 may be done by higher-layer signaling. For some embodiments, a dynamic cell switching may be realized by dynamically configuring a scheduling link within DCI, and a subframe offset parameter $N_{DCI-OFFSET}$ may be configured by DCI, or by higher-layer signaling, to inform a UE to perform a link switch at a later subframe (e.g., in a number of subframes $N_{DCI-OFFSET}$).

Figure 6:
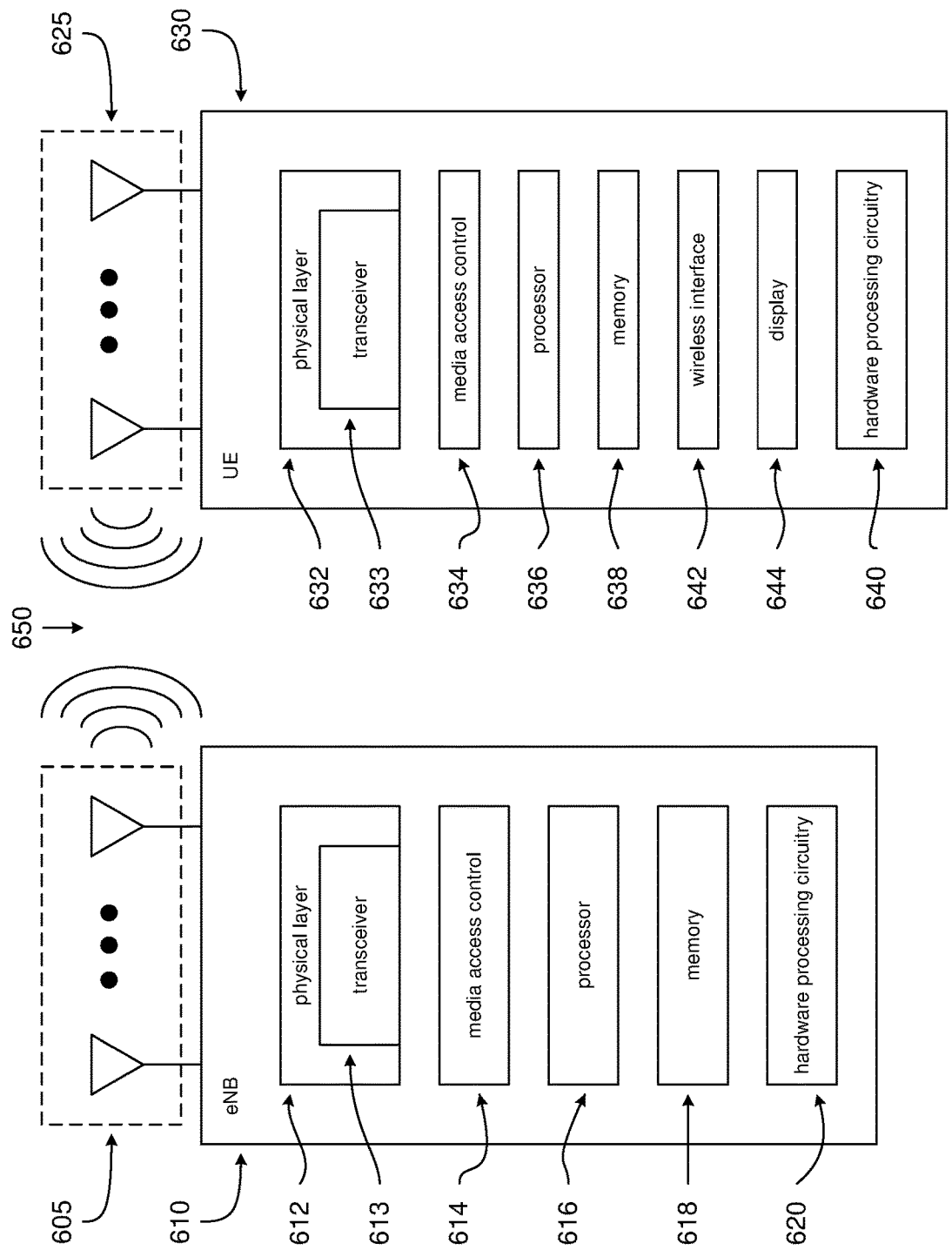
FIG. 6 illustrates an Evolved Node B (eNB) and a User Equipment (UE), in accordance with some embodiments of the disclosure.

FIG. 6 illustrates an eNB and a UE, in accordance with some embodiments of the disclosure. FIG. 6 includes block diagrams of an eNB 610 and a UE 630 which are operable to co-exist with each other and other elements of an LTE network. High-level, simplified architectures of eNB 610 and UE 630 are described so as not to obscure the embodiments. It should be noted that in some embodiments, eNB 610 may be a stationary non-mobile device.

eNB 610 is coupled to one or more antennas 605, and UE 630 is similarly coupled to one or more antennas 625. However, in some embodiments, eNB 610 may incorporate or comprise antennas 605, and UE 630 in various embodiments may incorporate or comprise antennas 625.

In some embodiments, antennas 605 and/or antennas 625 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 605 are separated to take advantage of spatial diversity.

eNB 610 and UE 630 are operable to communicate with each other on a network, such as a wireless network. eNB 610 and UE 630 may be in communication with each other over a wireless communication channel 650, which has both a downlink path from eNB 610 to UE 630 and an uplink path from UE 630 to eNB 610.

As illustrated in FIG. 6, in some embodiments, eNB 610 may include a physical layer circuitry 612, a MAC (media access control) circuitry 614, a processor 616, a memory 618, and a hardware processing circuitry 620. A person skilled in the art will appreciate that other components not shown may be used in addition to the components shown to form a complete eNB.

In some embodiments, physical layer circuitry 612 includes a transceiver 613 for providing signals to and from UE 630. Transceiver 613 provides signals to and from UEs or other devices using one or more antennas 605. In some embodiments, MAC circuitry 614 controls access to the wireless medium. Memory 618 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 620 may comprise logic devices or circuitry to perform various operations. In some embodiments, processor 616 and memory 618 are arranged to perform the operations of hardware processing circuitry 620, such as operations described herein with reference to logic devices and circuitry within eNB 610 and/or hardware processing circuitry 620.

Accordingly, in some embodiments, eNB 610 may be a device comprising an application processor, a memory, one or more antenna ports, and an interface for allowing the application processor to communicate with another device.

As is also illustrated in FIG. 6, in some embodiments, UE 630 may include a physical layer circuitry 632, a MAC circuitry 634, a processor 636, a memory 638, a hardware processing circuitry 640, a wireless interface 642, and a display 644. A person skilled in the art would appreciate that other components not shown may be used in addition to the components shown to form a complete UE.

In some embodiments, physical layer circuitry 632 includes a transceiver 633 for providing signals to and from eNB 610 (as well as other eNBs). Transceiver 633 provides signals to and from eNBs or other devices using one or more antennas 625. In some embodiments, MAC circuitry 634 controls access to the wireless medium. Memory 638 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 642 may be arranged to allow the processor to communicate with another device. Display 644 may provide a visual and/or tactile display for a user to interact with UE 630, such as a touch-screen display. Hardware processing circuitry 640 may comprise logic devices or circuitry to perform various operations. In some embodiments, processor 636 and memory 638 may be arranged to perform the operations of hardware processing circuitry 640, such as operations described herein with reference to logic devices and circuitry within UE 630 and/or hardware processing circuitry 640.

Accordingly, in some embodiments, UE 630 may be a device comprising an application processor, a memory, one or more antennas, a wireless interface for allowing the application processor to communicate with another device, and a touch-screen display.

Elements of FIG. 6, and elements of other figures having the same names or reference numbers, can operate or function in the manner described herein with respect to any such figures (although the operation and function of such elements is not limited to such descriptions). For example, FIGS. 7-8 and 11-12 also depict embodiments of eNBs, hardware processing circuitry of eNBs, UEs, and/or hardware processing circuitry of UEs, and the embodiments described with respect to FIG. 6 and FIGS. 7-8 and 11-12 can operate or function in the manner described herein with respect to any of the figures.

In addition, although eNB 610 and UE 630 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 7:
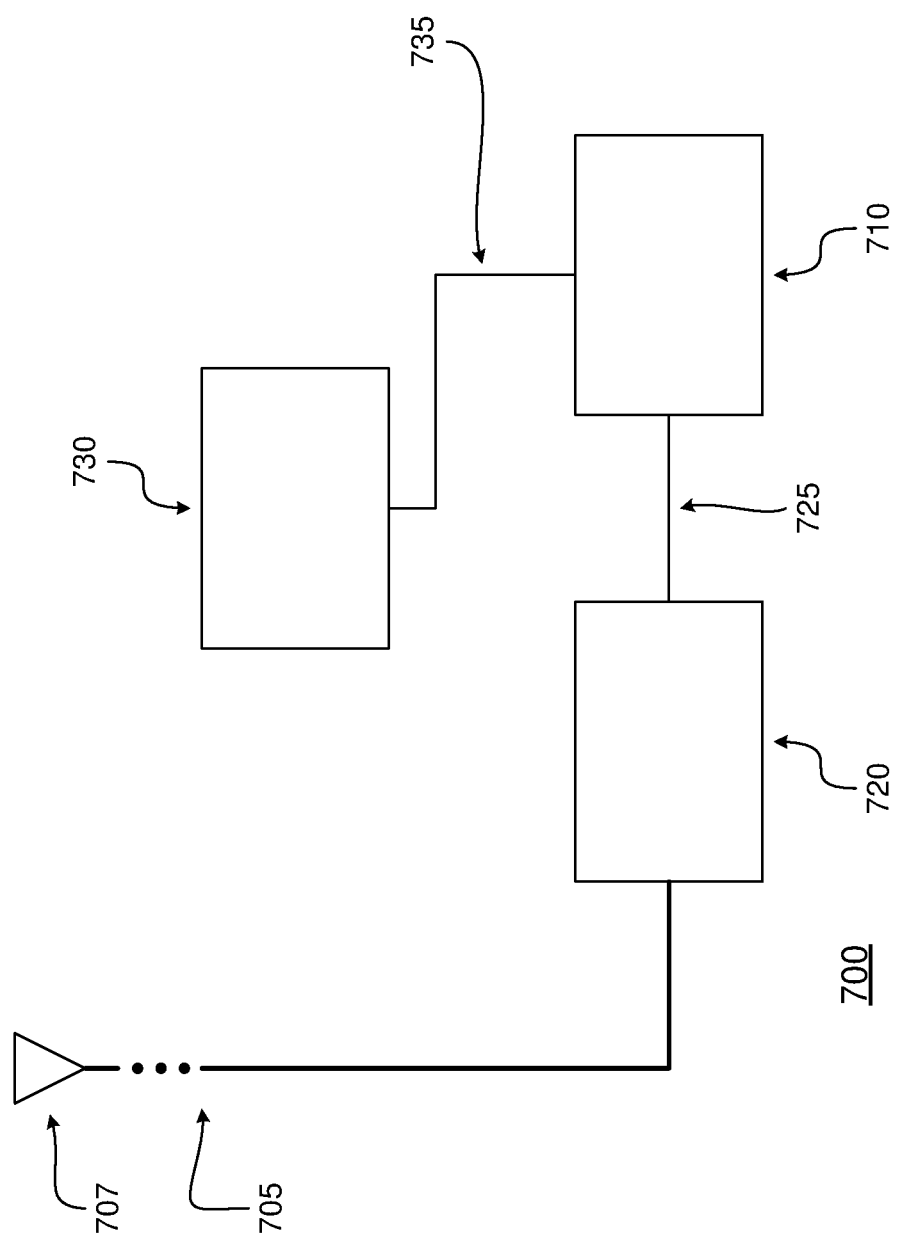
FIG. 7 illustrates hardware processing circuitries for a UE for cell switch commands in DCI, in accordance with some embodiments of the disclosure.
Figure 8:
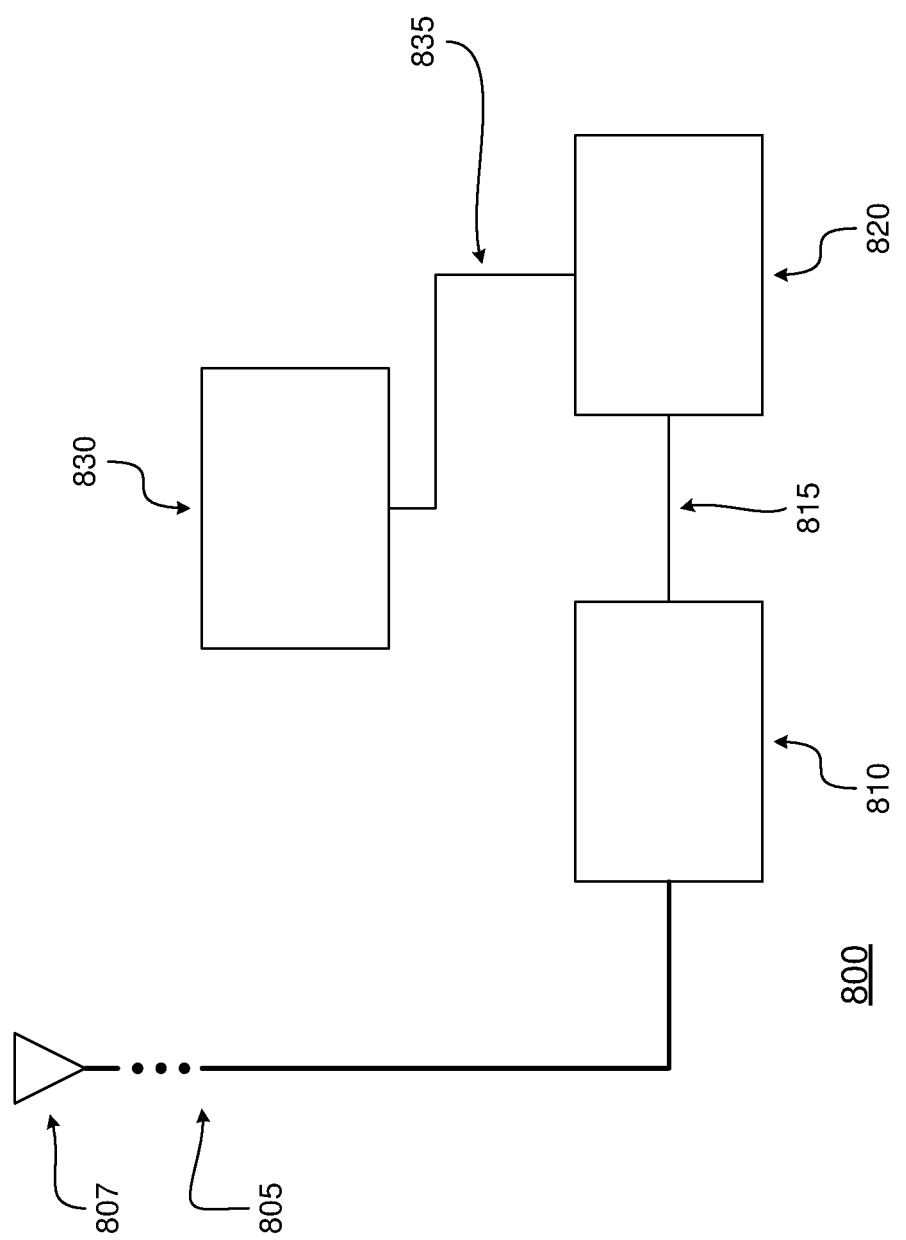
FIG. 8 illustrates hardware processing circuitries for a UE for different Orthogonal Frequency-Division Multiplexing (OFDM) symbols configured with different beamformed beams, in accordance with some embodiments of the disclosure.

FIG. 7 illustrates hardware processing circuitries for a UE for cell switch commands in DCI, in accordance with some embodiments of the disclosure. FIG. 8 illustrates hardware processing circuitries for a UE for different OFDM symbols configured with different beamformed beams, in accordance with some embodiments of the disclosure. With reference to FIG. 6, a UE may include various hardware processing circuitries discussed herein (such as hardware processing circuitry 700 of FIG. 7 and hardware processing circuitry 800 of FIG. 8), which may in turn comprise logic devices and/or circuitry operable to perform various operations. For example, in FIG. 6, UE 630 (or various elements or components therein, such as hardware processing circuitry 640, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 636 (and/or one or more other processors which UE 630 may comprise), memory 638, and/or other elements or components of UE 630 (which may include hardware processing circuitry 640) may be arranged to perform the operations of these hardware processing circuitries, such as operations described herein with reference to devices and circuitry within these hardware processing circuitries. In some embodiments, processor 636 (and/or one or more other processors which UE 630 may comprise) may be a baseband processor.

Returning to FIG. 7, an apparatus of UE 630 (or another UE or mobile handset), which may be operable to communicate with one or more eNBs on a wireless network, may comprise hardware processing circuitry 700. In some embodiments, hardware processing circuitry 700 may comprise one or more antenna ports 705 operable to provide various transmissions over a wireless communication channel (such as wireless communication channel 650). Antenna ports 705 may be coupled to one or more antennas 707 (which may be antennas 625). In some embodiments, hardware processing circuitry 700 may incorporate antennas 707, while in other embodiments, hardware processing circuitry 700 may merely be coupled to antennas 707.

Antenna ports 705 and antennas 707 may be operable to provide signals from a UE to a wireless communications channel and/or an eNB, and may be operable to provide signals from an eNB and/or a wireless communications channel to a UE. For example, antenna ports 705 and antennas 707 may be operable to provide transmissions from UE 630 to wireless communication channel 650 (and from there to eNB 610, or to another eNB). Similarly, antennas 707 and antenna ports 705 may be operable to provide transmissions from a wireless communication channel 650 (and beyond that, from eNB 610, or another eNB) to UE 630.

Hardware processing circuitry 700 may comprise various circuitries operable in accordance with the various embodiments discussed herein. With reference to FIG. 7, hardware processing circuitry 700 may comprise a first circuitry 710, a second circuitry 720, and/or a third circuitry 730. First circuitry 710 may be operable to establish a first UE Rx beam as being for reception of data from a first eNB. Second circuitry 720 may be operable to process a transmission including DCI, wherein the DCI carries an eNB cell-switching indicator. First circuitry 710 may also be operable to establish a second UE Rx beam as being for reception of data from a second eNB based on the eNB cell-switching indicator. Second circuitry 720 may be operable to provide the eNB cell-switching indicator to first circuitry 710 via an interface 725. Hardware processing circuitry 700 may also comprise an interface for receiving the transmission from a receiving circuitry.

In some embodiments, at least one of the first eNB or the second eNB may be associated with a virtual ID, and at least one of the first UE Rx beam or the second UE Rx may be established as being for reception of data from the first eNB or the second eNB, respectively, based on both the eNB cell-switching indicator and the virtual ID. For some embodiments, the second UE Rx beam may be established as being for reception of data from a second eNB at a subframe that is offset from a subset in which the transmission including DCI is processed.

For some embodiments, the UE may be configured with the offset by an additional DCI and/or higher-layer signaling. In some embodiments, third circuitry 730 may be operable to store an indicator listing one or more sets of active beam pair links respectively corresponding with one or more cells. Third circuitry 730 may provide the indicator listing one or more sets of active beam pair links to first circuitry 710 via an interface 735. In some embodiments, the indicator listing the one or more sets of active beam pair links may be configured by DCI and/or higher-layer signaling.

In some embodiments, first circuitry 710, second circuitry 720, and/or third circuitry 730 may be implemented as separate circuitries. In other embodiments, first circuitry 710, second circuitry 720, and/or third circuitry 730 may be combined and implemented together in a circuitry without altering the essence of the embodiments.

Returning to FIG. 8, an apparatus of UE 630 (or another UE or mobile handset), which may be operable to communicate with one or more eNBs on a wireless network, may comprise hardware processing circuitry 800. In some embodiments, hardware processing circuitry 800 may comprise one or more antenna ports 805 operable to provide various transmissions over a wireless communication channel (such as wireless communication channel 650). Antenna ports 805 may be coupled to one or more antennas 807 (which may be antennas 625). In some embodiments, hardware processing circuitry 800 may incorporate antennas 807, while in other embodiments, hardware processing circuitry 800 may merely be coupled to antennas 807.

Antenna ports 805 and antennas 807 may be operable to provide signals from a UE to a wireless communications channel and/or an eNB, and may be operable to provide signals from an eNB and/or a wireless communications channel to a UE. For example, antenna ports 805 and antennas 807 may be operable to provide transmissions from UE 630 to wireless communication channel 650 (and from there to eNB 610, or to another eNB). Similarly, antennas 807 and antenna ports 805 may be operable to provide transmissions from a wireless communication channel 650 (and beyond that, from eNB 610, or another eNB) to UE 630.

Hardware processing circuitry 800 may comprise various circuitries operable in accordance with the various embodiments discussed herein. With reference to FIG. 8, hardware processing circuitry 800 may comprise a first circuitry 810, a second circuitry 820, and/or a third circuitry 830. First circuitry 810 may be operable to process a first transmission received through a first UE Rx beam at a first OFDM symbol position. First circuitry 810 may also be operable to process a second transmission received through a second UE Rx beam at a second OFDM symbol position. Second circuitry 820 may be operable to establish the first UE Rx beam as being for reception of data following the first transmission based upon determining that the first transmission includes DCI. Second circuitry 820 may also be operable to establish the second UE Rx beam as being for reception of data following the second transmission based upon determining that the second transmission includes DCI. For the first transmission and the second transmission, first circuitry 810 may provide an indicator to second circuitry 820 comprising an indicator of the presence of DCI, or portions of the transmission that may bear DCI. In some embodiments, hardware processing circuitry 800 may comprise an interface for receiving the first transmission and the second transmission from a receiving circuitry.

In some embodiments, at least one of the first transmission and the second transmission may carry PDCCH.

For some embodiments, first circuitry 810 may also be operable to process a third transmission through the first UE Rx beam, the third transmission being processed at a subframe that is offset from a subframe in which the first transmission is processed. Second circuitry 820 may also be operable to establish the first UE Rx beam as being for reception of data following the third transmission based upon determining that the third transmission includes DCI.

In some embodiments, the UE may be configured with the offset by higher-layer signaling. For some embodiments, under a mapping rule, the first OFDM symbol and the second OFDM symbol may correspond to a virtual cell ID.

For some embodiments, third circuitry 830 may be operable to store an indicator listing one or more sets of active beam pair links respectively corresponding with one or more cells. The indicator listing the one or more sets of active beam pair links may be configured by DCI and/or higher-layer signaling.

In some embodiments, first circuitry 810, second circuitry 820, and/or third circuitry 830 may be implemented as separate circuitries. In other embodiments, first circuitry 810, second circuitry 820, and/or third circuitry 830 may be combined and implemented together in a circuitry without altering the essence of the embodiments.

Figure 9:
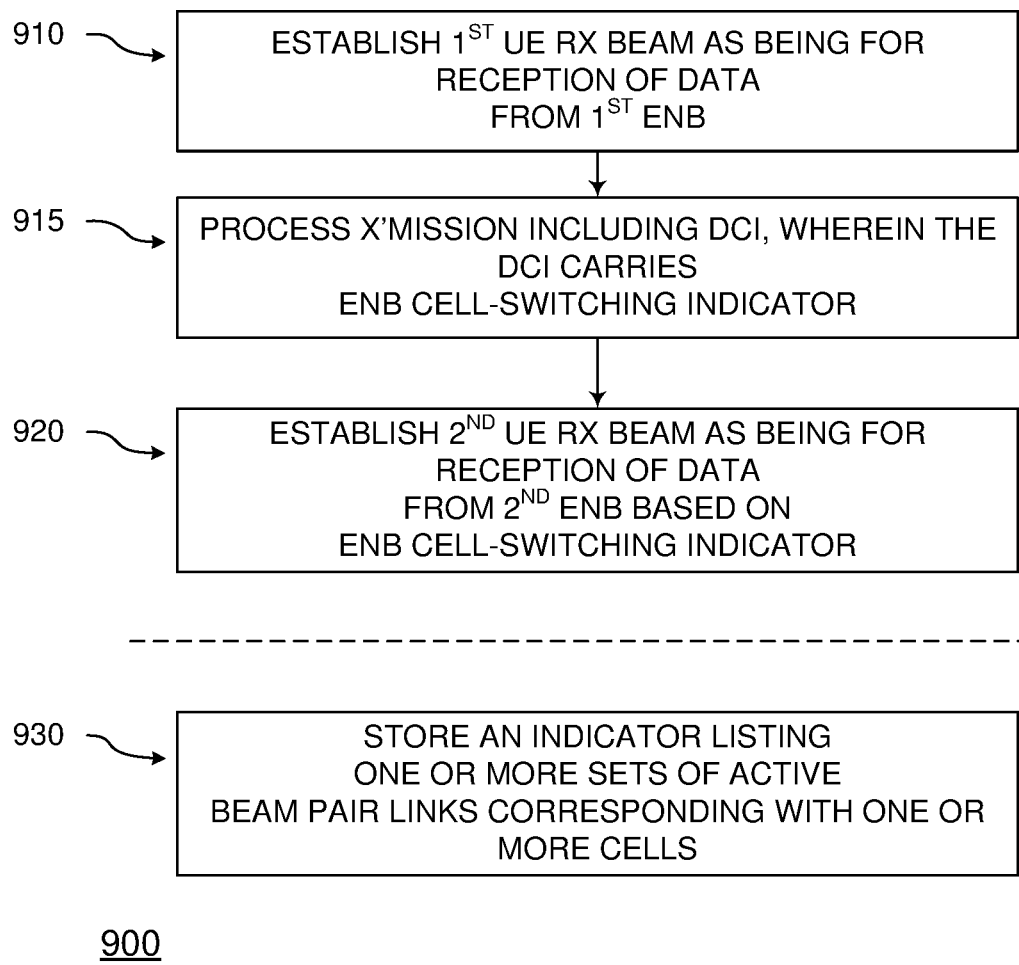
FIG. 9 illustrates methods for a UE for cell switch commands in DCI, in accordance with some embodiments of the disclosure.
Figure 10:
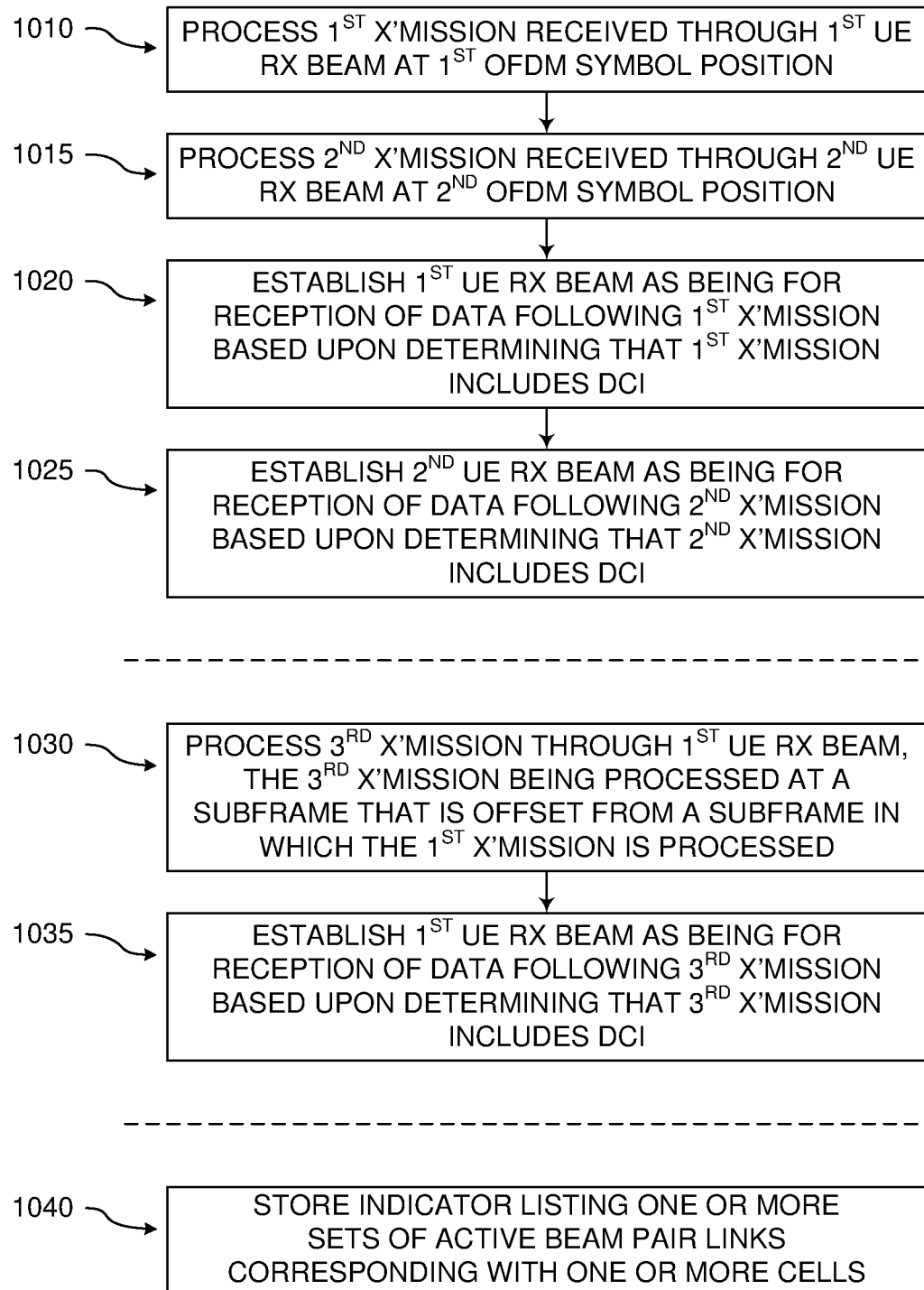
FIG. 10 illustrates methods for a UE for different OFDM symbols configured with different beamformed beams, in accordance with some embodiments of the disclosure.

FIG. 9 illustrates methods for a UE for cell switch commands in DCI, in accordance with some embodiments of the disclosure. FIG. 10 illustrates methods for a UE for different OFDM symbols configured with different beamformed beams, in accordance with some embodiments of the disclosure. With reference to FIG. 6, methods that may relate to UE 630 and hardware processing circuitry 640 are discussed herein. Although the actions in the method 900 of FIG. 9 and method 1000 of FIG. 10 are shown in a particular order, the order of the actions can be modified. Thus, the illustrated embodiments can be performed in a different order, and some actions may be performed in parallel. Some of the actions and/or operations listed in FIGS. 9 and 10 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 630 and/or hardware processing circuitry 640 to perform an operation comprising the methods of FIGS. 9 and 10. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 9 and 10.

Returning to FIG. 9, various methods may be in accordance with the various embodiments discussed herein. A method 900 may comprise an establishing 910, a processing 915, and establishing 920. In some embodiments, method 900 may comprise a storing 930.

In establishing 910, a first UE Rx beam may be established as being for reception of data from a first eNB. In processing 915, a transmission including DCI may be processed, wherein the DCI may carry an eNB cell-switching indicator. In establishing 920, a second UE Rx beam may be established as being for reception of data from a second eNB based on the eNB cell-switching indicator.

In some embodiments, at least one of the first eNB or the second eNB may be associated with a virtual ID, and at least one of the first UE Rx beam or the second UE Rx may be established as being for reception of data from the first eNB or the second eNB, respectively, based on both the eNB cell-switching indicator and the virtual ID. For some embodiments, the second UE Rx beam may be established as being for reception of data from a second eNB at a subframe that is offset from a subset in which the transmission including DCI is processed.

For some embodiments, the UE may be configured with the offset by an additional DCI and/or or higher-layer signaling. In some embodiments, in storing 930, an indicator listing one or more sets of active beam pair links respectively corresponding with one or more cells may be stored. In some embodiments, the indicator listing the one or more sets of active beam pair links may be configured by DCI and/or higher-layer signaling.

Returning to FIG. 10, various methods may be in accordance with the various embodiments discussed herein. A method 1000 may comprise a processing 1010, a processing 1015, an establishing 1020, and an establishing 1025. In various embodiments, method 1000 may also comprise a processing 1030, an establishing 1035, and/or a storing 1040.

In processing 1010, a first transmission received through a first UE Rx beam at a first OFDM symbol position may be processed. In processing 1015, a second transmission received through a second UE Rx beam at a second OFDM symbol position may be processed. In establishing 1020, the first UE Rx beam may be established as being for reception of data following the first transmission based upon determining that the first transmission includes DCI. In establishing 1025, the second UE Rx beam may be established as being for reception of data following the second transmission based upon determining that the second transmission includes DCI.

In some embodiments, at least one of the first transmission and the second transmission may carry PDCCH.

For some embodiments, in processing 1030, a third transmission may be processed through the first UE Rx beam. The third transmission may be processed at a subframe that is offset from a subframe in which the first transmission is processed. In some embodiments, in establishing 1035, the first UE Rx beam may be established as being for reception of data following the third transmission based upon determining that the third transmission includes DCI.

In some embodiments, the UE may be configured with the offset by higher-layer signaling. For some embodiments, under a mapping rule, the first OFDM symbol and the second OFDM symbol may correspond to a virtual cell ID.

For some embodiments, in storing 1040, an indicator listing one or more sets of active beam pair links respectively corresponding with one or more cells may be stored. In some embodiments, the indicator listing the one or more sets of active beam pair links may be configured by DCI and/or higher-layer signaling.

Figure 11:
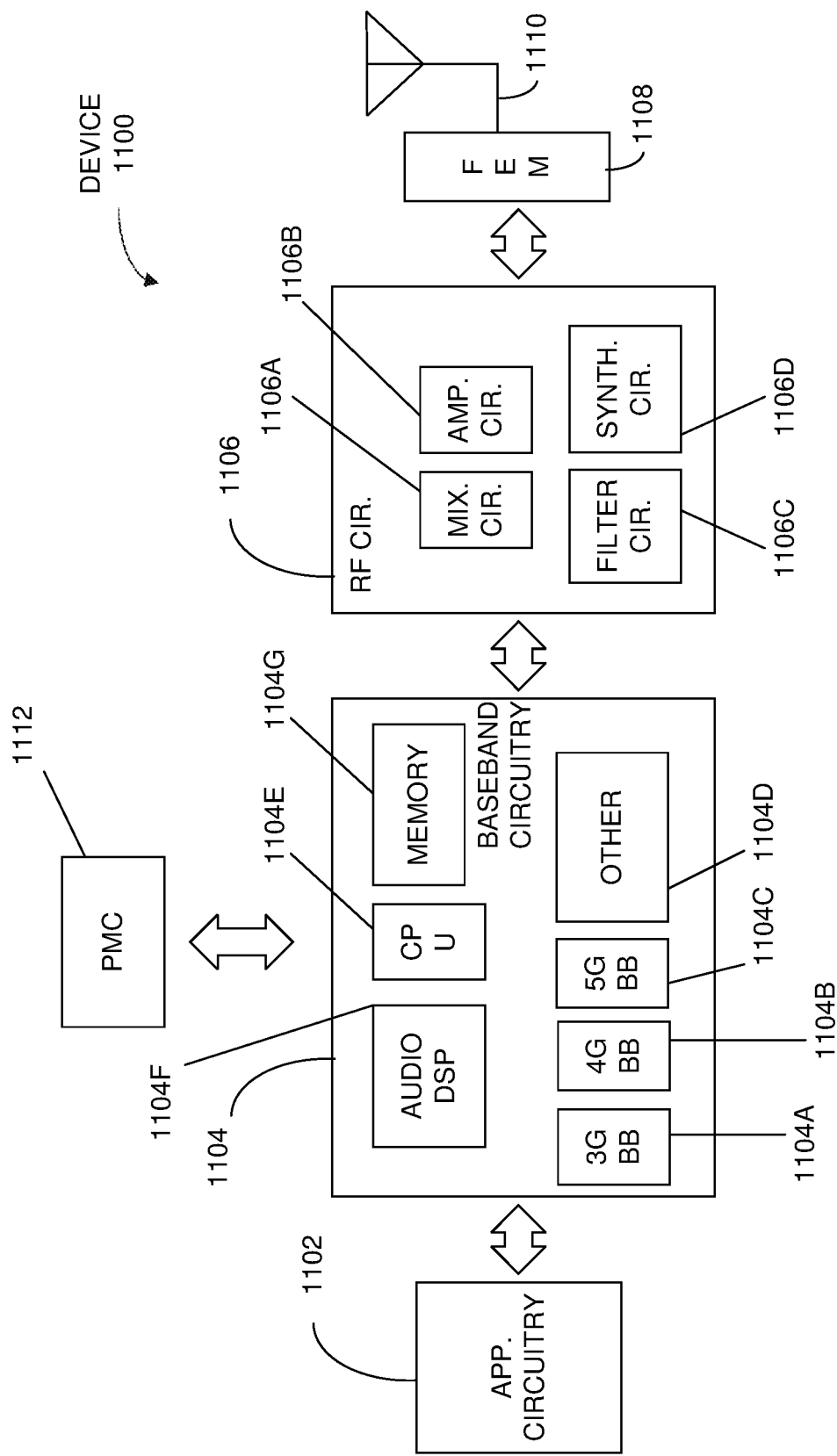
FIG. 11 illustrates example components of a device, in accordance with some embodiments of the disclosure.

FIG. 11 illustrates example components of a device, in accordance with some embodiments of the disclosure. In some embodiments, the device 1100 may include application circuitry 1102, baseband circuitry 1104, Radio Frequency (RF) circuitry 1106, front-end module (FEM) circuitry 1108, one or more antennas 1110, and power management circuitry (PMC) 1112 coupled together at least as shown. The components of the illustrated device 1100 may be included in a UE or a RAN node. In some embodiments, the device 1100 may include less elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1106 and to generate baseband signals for a transmit signal path of the RF circuitry 1106. Baseband processing circuitry 1104 may interface with the application circuitry 1102 for generation and processing of the baseband signals and for controlling operations of the RF circuitry 1106. For example, in some embodiments, the baseband circuitry 1104 may include a third generation (3G) baseband processor 1104A, a fourth generation (4G) baseband processor 1104B, a fifth generation (5G) baseband processor 1104C, or other baseband processor(s) 1104D for other existing generations, generations in development or to be developed in the future (e.g., second generation (2G), sixth generation (6G), etc.). The baseband circuitry 1104 (e.g., one or more of baseband processors 1104A-D) may handle various radio control functions that enable communication with one or more radio networks via the RF circuitry 1106. In other embodiments, some or all of the functionality of baseband processors 1104A-D may be included in modules stored in the memory 1104G and executed via a Central Processing Unit (CPU) 1104E. The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include one or more audio digital signal processor(s) (DSP) 1104F. The audio DSP(s) 1104F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1104 is configured to support radio communications of more than one wireless protocol may be referred to as multi-mode baseband circuitry.

RF circuitry 1106 may enable communication with wireless networks using modulated electromagnetic radiation through a non-solid medium. In various embodiments, the RF circuitry 1106 may include switches, filters, amplifiers, etc. to facilitate the communication with the wireless network. RF circuitry 1106 may include a receive signal path which may include circuitry to down-convert RF signals received from the FEM circuitry 1108 and provide baseband signals to the baseband circuitry 1104. RF circuitry 1106 may also include a transmit signal path which may include circuitry to up-convert baseband signals provided by the baseband circuitry 1104 and provide RF output signals to the FEM circuitry 1108 for transmission.

In some embodiments, the receive signal path of the RF circuitry 1106 may include mixer circuitry 1106A, amplifier circuitry 1106B and filter circuitry 1106C. In some embodiments, the transmit signal path of the RF circuitry 1106 may include filter circuitry 1106C and mixer circuitry 1106A. RF circuitry 1106 may also include synthesizer circuitry 1106D for synthesizing a frequency for use by the mixer circuitry 1106A of the receive signal path and the transmit signal path. In some embodiments, the mixer circuitry 1106A of the receive signal path may be configured to down-convert RF signals received from the FEM circuitry 1108 based on the synthesized frequency provided by synthesizer circuitry 1106D. The amplifier circuitry 1106B may be configured to amplify the down-converted signals and the filter circuitry 1106C may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, mixer circuitry 1106A of the receive signal path may comprise passive mixers, although the scope of the embodiments is not limited in this respect.

In some embodiments, the mixer circuitry 1106A of the transmit signal path may be configured to up-convert input baseband signals based on the synthesized frequency provided by the synthesizer circuitry 1106D to generate RF output signals for the FEM circuitry 1108. The baseband signals may be provided by the baseband circuitry 1104 and may be filtered by filter circuitry 1106C.

In some embodiments, the mixer circuitry 1106A of the receive signal path and the mixer circuitry 1106A of the transmit signal path may include two or more mixers and may be arranged for quadrature downconversion and upconversion, respectively. In some embodiments, the mixer circuitry 1106A of the receive signal path and the mixer circuitry 1106A of the transmit signal path may include two or more mixers and may be arranged for image rejection (e.g., Hartley image rejection). In some embodiments, the mixer circuitry 1106A of the receive signal path and the mixer circuitry 1106A may be arranged for direct downconversion and direct upconversion, respectively. In some embodiments, the mixer circuitry 1106A of the receive signal path and the mixer circuitry 1106A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1106 may include analog-to-digital converter (ADC) and digital-to-analog converter (DAC) circuitry and the baseband circuitry 1104 may include a digital baseband interface to communicate with the RF circuitry 1106.

In some dual-mode embodiments, a separate radio IC circuitry may be provided for processing signals for each spectrum, although the scope of the embodiments is not limited in this respect.

In some embodiments, the synthesizer circuitry 1106D may be a fractional-N synthesizer or a fractional N/N+1 synthesizer, although the scope of the embodiments is not limited in this respect as other types of frequency synthesizers may be suitable. For example, synthesizer circuitry 1106D may be a delta-sigma synthesizer, a frequency multiplier, or a synthesizer comprising a phase-locked loop with a frequency divider.

The synthesizer circuitry 1106D may be configured to synthesize an output frequency for use by the mixer circuitry 1106A of the RF circuitry 1106 based on a frequency input and a divider control input. In some embodiments, the synthesizer circuitry 1106D may be a fractional N/N+1 synthesizer.

In some embodiments, frequency input may be provided by a voltage controlled oscillator (VCO), although that is not a requirement. Divider control input may be provided by either the baseband circuitry 1104 or the applications processor 1102 depending on the desired output frequency. In some embodiments, a divider control input (e.g., N) may be determined from a look-up table based on a channel indicated by the applications processor 1102.

Synthesizer circuitry 1106D of the RF circuitry 1106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1106D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1106 may include an IQ/polar converter.

FEM circuitry 1108 may include a receive signal path which may include circuitry configured to operate on RF signals received from one or more antennas 1110, amplify the received signals and provide the amplified versions of the received signals to the RF circuitry 1106 for further processing. FEM circuitry 1108 may also include a transmit signal path which may include circuitry configured to amplify signals for transmission provided by the RF circuitry 1106 for transmission by one or more of the one or more antennas 1110. In various embodiments, the amplification through the transmit or receive signal paths may be done solely in the RF circuitry 1106, solely in the FEM 1108, or in both the RF circuitry 1106 and the FEM 1108.

In some embodiments, the FEM circuitry 1108 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1106). The transmit signal path of the FEM circuitry 1108 may include a power amplifier (PA) to amplify input RF signals (e.g., provided by RF circuitry 1106), and one or more filters to generate RF signals for subsequent transmission (e.g., by one or more of the one or more antennas 1110).

In some embodiments, the PMC 1112 may manage power provided to the baseband circuitry 1104. In particular, the PMC 1112 may control power-source selection, voltage scaling, battery charging, or DC-to-DC conversion. The PMC 1112 may often be included when the device 1100 is capable of being powered by a battery, for example, when the device is included in a UE. The PMC 1112 may increase the power conversion efficiency while providing desirable implementation size and heat dissipation characteristics.

While FIG. 11 shows the PMC 1112 coupled only with the baseband circuitry 1104. However, in other embodiments, the PMC 1112 may be additionally or alternatively coupled with, and perform similar power management operations for, other components such as, but not limited to, application circuitry 1102, RF circuitry 1106, or FEM 1108.

In some embodiments, the PMC 1112 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used execute Layer 3, Layer 2, or Layer 1 functionality, while processors of the application circuitry 1104 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
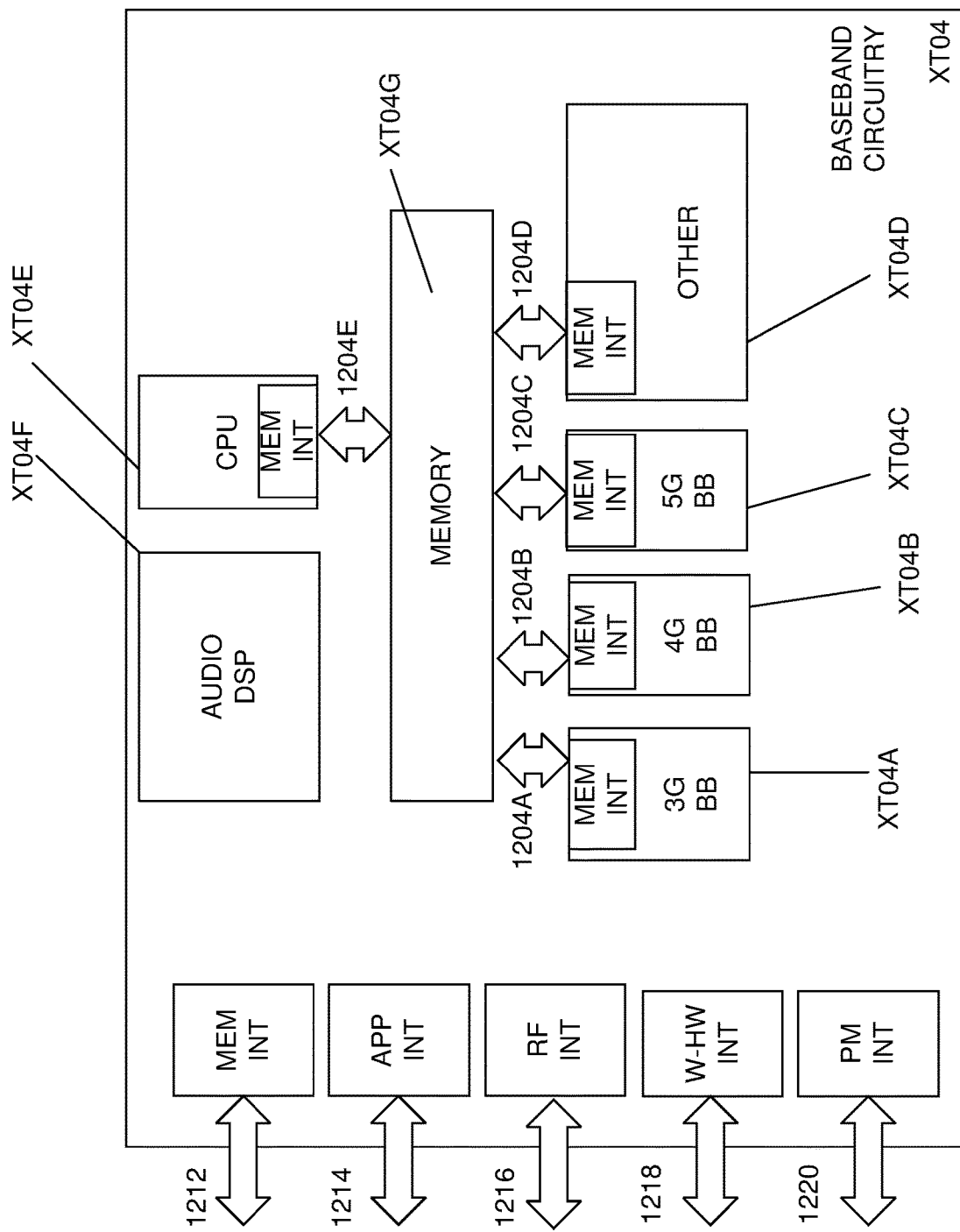
FIG. 12 illustrates example interfaces of baseband circuitry, in accordance with some embodiments of the disclosure.

FIG. 12 illustrates example interfaces of baseband circuitry, in accordance with some embodiments of the disclosure. As discussed above, the baseband circuitry 1104 of FIG. 11 may comprise processors 1104A-1104E and a memory 1104G utilized by said processors. Each of the processors 1104A-1104E may include a memory interface, 1204A-1204E, respectively, to send/receive data to/from the memory 1104G.

The baseband circuitry 1104 may further include one or more interfaces to communicatively couple to other circuitries/devices, such as a memory interface 1212 (e.g., an interface to send/receive data to/from memory external to the baseband circuitry 1104), an application circuitry interface 1214 (e.g., an interface to send/receive data to/from the application circuitry 1102 of FIG. 11), an RF circuitry interface 1216 (e.g., an interface to send/receive data to/from RF circuitry 1106 of FIG. 11), a wireless hardware connectivity interface 1218 (e.g., an interface to send/receive data to/from Near Field Communication (NFC) components, Bluetooth® components (e.g., Bluetooth® Low Energy), Wi-Fi® components, and other communication components), and a power management interface 1220 (e.g., an interface to send/receive power or control signals to/from the PMC 1112).

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with a plurality of Evolved Node Bs (eNBs) on a wireless network, comprising: one or more processors to: establish a first UE Receive (Rx) beam as being for reception of data from a first eNB; process a transmission including Downlink Control Information (DCI), wherein the DCI carries an eNB cell-switching indicator; and establish a second UE Rx beam as being for reception of data from a second eNB based on the eNB cell-switching indicator, and an interface for receiving the transmission from a receiving circuitry.

In example 2, the apparatus of example 1, wherein at least one of the first eNB or the second eNB is associated with a virtual ID, and wherein at least one of the first UE Rx beam or the second UE Rx beam is established as being for reception of data from the first eNB or the second eNB, respectively, based on both the eNB cell-switching indicator and the virtual ID.

In example 3, the apparatus of either of examples 1 or 2, wherein the second UE Rx beam is established as being for reception of data from a second eNB at a subframe that is offset from a subset in which the transmission including DCI is processed.

In example 4, the apparatus of example 3, wherein the UE is configured with the offset by one of: an additional DCI, or higher-layer signaling.

In example 5, the apparatus of any of examples 1 through 4, wherein the one or more processors are to: store an indicator listing one or more sets of active beam pair links respectively corresponding with one or more cells.

In example 6, the apparatus of example 5, wherein the indicator listing the one or more sets of active beam pair links is configured by one of: DCI, or higher-layer signaling.

Example 7 provides a User Equipment (UE) device comprising an application processor, a memory, one or more antennas, a wireless interface for allowing the application processor to communicate with another device, and a touchscreen display, the UE device including the apparatus of any of examples 1 through 6.

Example 8 provides a method comprising: establishing, for a User Equipment (UE), a first UE Receive (Rx) beam as being for reception of data from a first eNB; processing a transmission including Downlink Control Information (DCI), wherein the DCI carries an eNB cell-switching indicator; and establishing a second UE Rx beam as being for reception of data from a second eNB based on the eNB cell-switching indicator.

In example 9, the method of example 8, wherein at least one of the first eNB or the second eNB is associated with a virtual ID, and wherein at least one of the first UE Rx beam or the second UE Rx is established as being for reception of data from the first eNB or the second eNB, respectively, based on both the eNB cell-switching indicator and the virtual ID.

In example 10, the method of either of examples 8 or 9, wherein the second UE Rx beam is established as being for reception of data from a second eNB at a subframe that is offset from a subset in which the transmission including DCI is processed.

In example 11, the method of example 10, wherein the UE is configured with the offset by one of: an additional DCI, or higher-layer signaling.

In example 12, the method of examples 8 through 11, comprising: storing an indicator listing one or more sets of active beam pair links respectively corresponding with one or more cells.

In example 13, the method of example 12, wherein the indicator listing the one or more sets of active beam pair links is configured by one of: DCI, or higher-layer signaling.

Example 14 provides machine readable storage media having machine executable instructions stored thereon that, when executed, cause one or more processors to perform a method according to any of examples 8 through 13.

Example 15 provides an apparatus of a User Equipment (UE) operable to communicate with a plurality of Evolved Node Bs (eNBs) on a wireless network, comprising: means for establishing a first UE Receive (Rx) beam as being for reception of data from a first eNB; means for processing a transmission including Downlink Control Information (DCI), wherein the DCI carries an eNB cell-switching indicator; and means for establishing a second UE Rx beam as being for reception of data from a second eNB based on the eNB cell-switching indicator.

In example 16, the apparatus of example 15, wherein at least one of the first eNB or the second eNB is associated with a virtual ID, and wherein at least one of the first UE Rx beam or the second UE Rx is established as being for reception of data from the first eNB or the second eNB, respectively, based on both the eNB cell-switching indicator and the virtual ID.

In example 17, the apparatus of either of examples 15 or 16, wherein the second UE Rx beam is established as being for reception of data from a second eNB at a subframe that is offset from a subset in which the transmission including DCI is processed.

In example 18, the apparatus of example 17, wherein the UE is configured with the offset by one of: an additional DCI, or higher-layer signaling.

In example 19, the apparatus of examples 15 through 18, comprising: means for storing an indicator listing one or more sets of active beam pair links respectively corresponding with one or more cells.

In example 20, the apparatus of example 19, wherein the indicator listing the one or more sets of active beam pair links is configured by one of: DCI, or higher-layer signaling.

Example 21 provides machine readable storage media having machine executable instructions that, when executed, cause one or more processors of a User Equipment (UE) operable to communicate with an Evolved Node-B (eNB) on a wireless network to perform an operation comprising: establish a first UE Receive (Rx) beam as being for reception of data from a first eNB; process a transmission including Downlink Control Information (DCI), wherein the DCI carries an eNB cell-switching indicator; and establish a second UE Rx beam as being for reception of data from a second eNB based on the eNB cell-switching indicator.

In example 22, the machine readable storage media of example 21, wherein at least one of the first eNB or the second eNB is associated with a virtual ID, and wherein at least one of the first UE Rx beam or the second UE Rx is established as being for reception of data from the first eNB or the second eNB, respectively, based on both the eNB cell-switching indicator and the virtual ID.

In example 23, the machine readable storage media of either of examples 21 or 22, wherein the second UE Rx beam is established as being for reception of data from a second eNB at a subframe that is offset from a subset in which the transmission including DCI is processed.

In example 24, the machine readable storage media of example 23, wherein the UE is configured with the offset by one of: an additional DCI, or higher-layer signaling.

In example 25, the machine readable storage media of examples 21 through 24, the operation comprising: store an indicator listing one or more sets of active beam pair links respectively corresponding with one or more cells.

In example 26, the machine readable storage media of example 25, wherein the indicator listing the one or more sets of active beam pair links is configured by one of: DCI, or higher-layer signaling.

Example 27 provides an apparatus of a User Equipment (UE) operable to communicate with a plurality of Evolved Node Bs (eNBs) on a wireless network, comprising: one or more processors to: process a first transmission received through a first UE Receive (Rx) beam at a first Orthogonal Frequency-Division Multiplexing (OFDM) symbol position; process a second transmission received through a second UE Rx beam at a second OFDM symbol position; establish the first UE Rx beam as being for reception of data following the first transmission based upon determining that the first transmission includes Downlink Control Information (DCI); and establish the second UE Rx beam as being for reception of data following the second transmission based upon determining that the second transmission includes DCI, and an interface for receiving the first transmission and the second transmission from a receiving circuitry.

In example 28, the apparatus of example 27, wherein at least one of the first transmission and the second transmission carries Physical Downlink Control Channel (PDCCH).

In example 29, the apparatus of either of examples 27 or 28, wherein the one or more processors are to: process a third transmission through the first UE Rx beam, the third transmission being processed at a subframe that is offset from a subframe in which the first transmission is processed; and establish the first UE Rx beam as being for reception of data following the third transmission based upon determining that the third transmission includes DCI.

In example 30, the apparatus of example 29, wherein the UE is configured with the offset by higher-layer signaling.

In example 31, the apparatus of any of examples 27 through 30, wherein under a mapping rule, the first OFDM symbol and the second OFDM symbol correspond to a virtual cell ID.

In example 32, the apparatus of any of examples 27 through 31, wherein the one or more processors are to: store an indicator listing one or more sets of active beam pair links respectively corresponding with one or more cells.

In example 33, the apparatus of example 32, wherein the indicator listing the one or more sets of active beam pair links is configured by one of: DCI, or higher-layer signaling.

Example 34 provides a User Equipment (UE) device comprising an application processor, a memory, one or more antennas, a wireless interface for allowing the application processor to communicate with another device, and a touchscreen display, the UE device including the apparatus of any of examples 27 through 33.

Example 35 provides a method comprising: processing, for a User Equipment (UE), a first transmission received through a first UE Receive (Rx) beam at a first Orthogonal Frequency-Division Multiplexing (OFDM) symbol position; processing a second transmission received through a second UE Rx beam at a second OFDM symbol position; establishing the first UE Rx beam as being for reception of data following the first transmission based upon determining that the first transmission includes Downlink Control Information (DCI); and establishing the second UE Rx beam as being for reception of data following the second transmission based upon determining that the second transmission includes DCI.

In example 36, the method of example 35, wherein at least one of the first transmission and the second transmission carries Physical Downlink Control Channel (PDCCH).

In example 37, the method of either of examples 35 or 36, comprising: processing a third transmission through the first UE Rx beam, the third transmission being processed at a subframe that is offset from a subframe in which the first transmission is processed; and establishing the first UE Rx beam as being for reception of data following the third transmission based upon determining that the third transmission includes DCI.

In example 38, the method of example 37, wherein the UE is configured with the offset by higher-layer signaling.

In example 39, the method of any of examples 35 through 38, wherein under a mapping rule, the first OFDM symbol and the second OFDM symbol correspond to a virtual cell ID.

In example 40, the method of any of examples 35 through 39, comprising: storing an indicator listing one or more sets of active beam pair links respectively corresponding with one or more cells.

In example 41, the machine readable storage media of example 40, wherein the indicator listing the one or more sets of active beam pair links is configured by one of: DCI, or higher-layer signaling.

Example 42 provides machine readable storage media having machine executable instructions stored thereon that, when executed, cause one or more processors to perform a method according to any of examples 35 through 41.

Example 43 provides an apparatus of a User Equipment (UE) operable to communicate with a plurality of Evolved Node Bs (eNBs) on a wireless network, comprising: means for processing a first transmission received through a first UE Receive (Rx) beam at a first Orthogonal Frequency-Division Multiplexing (OFDM) symbol position; means for processing a second transmission received through a second UE Rx beam at a second OFDM symbol position; means for establishing the first UE Rx beam as being for reception of data following the first transmission based upon determining that the first transmission includes Downlink Control Information (DCI); and means for establishing the second UE Rx beam as being for reception of data following the second transmission based upon determining that the second transmission includes DCI.

In example 44, the apparatus of example 43, wherein at least one of the first transmission and the second transmission carries Physical Downlink Control Channel (PDCCH).

In example 45, the apparatus of either of examples 43 or 44, comprising: means for processing a third transmission through the first UE Rx beam, the third transmission being processed at a subframe that is offset from a subframe in which the first transmission is processed; and means for establishing the first UE Rx beam as being for reception of data following the third transmission based upon determining that the third transmission includes DCI.

In example 46, the apparatus of example 45, wherein the UE is configured with the offset by higher-layer signaling.

In example 47, the apparatus of any of examples 43 through 46, wherein under a mapping rule, the first OFDM symbol and the second OFDM symbol correspond to a virtual cell ID.

In example 48, the apparatus of any of examples 43 through 47, comprising: means for storing an indicator listing one or more sets of active beam pair links respectively corresponding with one or more cells.

In example 49, the apparatus of example 48, wherein the indicator listing the one or more sets of active beam pair links is configured by one of: DCI, or higher-layer signaling.

Example 50 provides machine readable storage media having machine executable instructions that, when executed, cause one or more processors of a User Equipment (UE) operable to communicate with an Evolved Node-B (eNB) on a wireless network to perform an operation comprising: process a first transmission received through a first UE Receive (Rx) beam at a first Orthogonal Frequency-Division Multiplexing (OFDM) symbol position; process a second transmission received through a second UE Rx beam at a second OFDM symbol position; establish the first UE Rx beam as being for reception of data following the first transmission based upon determining that the first transmission includes Downlink Control Information (DCI); and establish the second UE Rx beam as being for reception of data following the second transmission based upon determining that the second transmission includes DCI.

In example 51, the machine readable storage media of example 50, wherein at least one of the first transmission and the second transmission carries Physical Downlink Control Channel (PDCCH).

In example 52, the machine readable storage media of either of examples 50 or 51, the operation comprising: process a third transmission through the first UE Rx beam, the third transmission being processed at a subframe that is offset from a subframe in which the first transmission is processed; and establish the first UE Rx beam as being for reception of data following the third transmission based upon determining that the third transmission includes DCI.

In example 53, the machine readable storage media of example 52, wherein the UE is configured with the offset by higher-layer signaling.

In example 54, the machine readable storage media of any of examples 50 through 53, wherein under a mapping rule, the first OFDM symbol and the second OFDM symbol correspond to a virtual cell ID.

In example 55, the machine readable storage media of any of examples 50 through 54, the operation comprising: store an indicator listing one or more sets of active beam pair links respectively corresponding with one or more cells.

In example 56, the machine readable storage media of example 55, wherein the indicator listing the one or more sets of active beam pair links is configured by one of: DCI, or higher-layer signaling.

In example 57, the apparatus of any of examples 1 through 6, and 27 through 33, wherein the one or more processors comprise a baseband processor.

In example 58, the apparatus of any of examples 1 through 6, and 27 through 33, comprising a memory for storing instructions, the memory being coupled to the one or more processors.

In example 59, the apparatus of any of examples 1 through 6, and 27 through 33, comprising a transceiver circuitry for at least one of: generating transmissions, encoding transmissions, processing transmissions, or decoding transmissions.

In example 60, the apparatus of any of examples 1 through 6, and 27 through 33, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus of a User Equipment (UE) operable to communicate with multiple transmission and reception points (TRPs) associated with a cell of a wireless network, the apparatus comprising:
a memory configured to store instructions;
a processor coupled to the memory, and when executing the instructions, configured to cause the UE to:
receive a configuration comprising multiple control channel sets, a first control channel set of the multiple control channel sets associated with an identity of a first TRP of the multiple TRPs;
determine a first receive beam to apply based on the identity of the first TRP; and
monitor the first control channel set for first downlink control information with the first receive beam applied based on the configuration.

2. The apparatus of claim 1, wherein the first control channel set is configured with a first monitoring pattern in time, and wherein the first control channel set is monitored during the first monitoring pattern in time.

3. The apparatus of claim 2, wherein the first monitoring pattern is a subframe pattern, and the first control channel set is monitored during one or more subframes of the subframe pattern.

4. The apparatus of claim 1, wherein the first downlink control information schedules downlink data to be received from the first TRP via the first receive beam.

5. The apparatus of claim 1,
wherein a second control channel set of the multiple control channel sets is associated with an identity of a second TRP of the multiple TRPs and a second receive beam; and
wherein the processor is further configured to cause the UE to monitor the second control channel set for second downlink control information with the second receive beam applied based on the configuration.

6. The apparatus of claim 5, wherein the first control channel set is associated with a first search space, and the second control channel set is associated with a second search space.

7. The apparatus of claim 6, wherein the first search space is monitored during a first monitoring period, and the second search space is monitored during a second monitoring period.

8. The apparatus of claim 1, wherein the processor is further configured to cause the UE to:
measure mobility reference signal or beamformed channel state information reference signals (CSI-RS) to be received from the first TRP; and
transmit a measurement report including measurement results of the mobility reference signal or beamformed CSI-RS received via one or more receive beam candidates,
wherein the first receive beam is selected from the one or more receive beam candidates and associated with the identity of the first TRP if a measurement result of the first receive beam is optimized among the one or more receive beam candidates.

9. An apparatus of a User Equipment (UE) operable to communicate with multiple transmission and reception points (TRPs) associated with a cell of a wireless network, the apparatus comprising:
a memory configured to store instructions;
a processor coupled to the memory, and when executing the instructions, configured to cause the UE to:
receive a configuration comprising multiple search spaces, each search space of the multiple search spaces is associated with an identity of a TRP of the multiple TRPs;
determine downlink control channel candidates from more than one search space of the multiple search spaces that carry repetitions of a control channel transmission;
determine receive beams for downlink control channel candidates; and
decode downlink control channel candidates with the determined receive beams applied.

10. The apparatus of claim 9, wherein the downlink control channel candidates are at a particular aggregation level.

11. The apparatus of claim 9, wherein the downlink control channel candidates are each configured with a specific monitoring pattern in time.

12. The apparatus of claim 9, wherein a search space of the more than one search spaces includes downlink control channel candidates that carry repetitions of downlink control channel transmissions carried by more than one other search spaces.

13. The apparatus of claim 12, wherein the search space of the more than one search spaces is associated with identities of multiple TRPs.

14. An apparatus of a network device operable to communicate with a User Equipment (UE) via multiple transmission and reception points (TRPs) associated with a cell of a wireless network, the apparatus comprising:
   a memory configured to store instructions;
   a processor coupled to the memory, and when executing the instructions, configured to cause the network device to:
      transmit, to the UE, reference signal from the multiple TRPs;
      receive a measurement report including measurement results of reference signal received from the multiple TRPs, the measurement report indicates or suggests a receive beam for each of the multiple TRPs;
      transmit a configuration comprising control channel sets and/or search spaces correspondingly associated with the multiple TRPs; and
      transmit, to the UE, downlink control information respectively from the multiple TRPs on the control channel sets.

15. The apparatus of claim 14, wherein the control channel sets and/or the search spaces are configured with different monitoring patterns in time.

16. The apparatus of claim 15, wherein the monitoring patterns are subframe patterns with one or more subframes available.

17. The apparatus of claim 15, wherein the configuration associates the multiple TRPs with corresponding receive beams.

18. The apparatus of claim 17, wherein the corresponding receive beams are selected from receive beam candidates for the multiple TRP such that the measurement results of reference signal are optimized for the multiple TRPs.

19. The apparatus of claim 17, wherein the processor is further configured to cause the network device to transmit downlink data or receive uplink data via the multiple TRPs and the corresponding receive beams based on scheduling transmitted in the downlink control information.

20. The apparatus of claim 14, wherein the reference signal is mobility reference signal or beamformed channel state information reference signals (CSI-RS).

\* \* \* \* \*